United States Patent [19]

Yoshino et al.

[11] Patent Number: 4,839,128
[45] Date of Patent: Jun. 13, 1989

[54] LOW-TEMPERATURE-PROCESSIBLE COPOLYESTERAMIDES, PREPARATION OF MOLDED ARTICLES THEREFROM AND COMPOSITIONS THEREOF

[75] Inventors: Kenji Yoshino; Tadahiro Wakui; Yumiko Kumazawa; Mitsuhiko Izumi; Touru Yamagishi, all of Chiba, Japan

[73] Assignee: Kawasaki Steel Corp., Hyogo, Japan

[21] Appl. No.: 149,501

[22] Filed: Jan. 28, 1988

[30] Foreign Application Priority Data

Jan. 30, 1987 [JP] Japan ................... 62-20208
Apr. 24, 1987 [JP] Japan ................... 62-102714

[51] Int. Cl.$^4$ .......................................... C08G 69/44
[52] U.S. Cl. ........................ 264/328.1; 524/435; 524/456; 524/602; 524/605; 524/779; 524/785; 524/876; 528/183; 528/184; 528/185; 528/193
[58] Field of Search ............... 528/193, 183, 184, 185; 524/456, 602, 605, 435, 785, 779, 876; 264/328.1

[56] References Cited

U.S. PATENT DOCUMENTS

| | | | |
|---|---|---|---|
| 3,637,595 | 1/1972 | Cottis et al. | 528/193 |
| 4,182,842 | 1/1980 | Jackson et al. | 528/292 |
| 4,189,549 | 2/1980 | Matsunaga | 525/439 |
| 4,313,870 | 2/1982 | Umai et al. | 260/40 R |
| 4,395,513 | 7/1983 | Calundann | 524/599 |
| 4,414,365 | 11/1983 | Sugimoto et al. | 525/437 |
| 4,539,386 | 9/1985 | Yoon | 528/183 |
| 4,717,624 | 1/1988 | Ukanaga et al. | 428/423.1 |
| 4,719,250 | 1/1988 | Eickman et al. | 523/212 |

FOREIGN PATENT DOCUMENTS

| | | |
|---|---|---|
| 5622810 | 8/1972 | Japan. |
| 57-55534 | 4/1982 | Japan. |
| 57-55535 | 4/1982 | Japan. |
| 57-56126 | 4/1982 | Japan. |
| 56-182352 | 4/1982 | Japan. |
| 57-199872 | 11/1982 | Japan. |
| 60-78997 | 7/1984 | Japan. |
| 60-78998 | 7/1984 | Japan. |
| 60-79066 | 7/1984 | Japan. |

OTHER PUBLICATIONS

Japanese Patent Application, Kokai No. 58-84821 (only Eng. Abstract available for review).
Japanese Patent Application No. 56-22810 (only Eng. Abstract available for review).

*Primary Examiner*—Maurice J. Welsh
*Assistant Examiner*—L. Henderson
*Attorney, Agent, or Firm*—Bierman and Muserlian Copolyesteramides consisting of specific units can be injection molded at a low temperature into a part having a high heat distortion temperature. A filled composition is obtained by blending the copolyesteramide with an inorganic filler. A magnetic resin composition is obtained by blending the copolyesteramide with an magnetic powder.

The copolyesteramide consists essentially of units $<I>$, $<II>$, $<III>$, $<IV>$, and $<V>$ of the following formulae:

wherein
each of $R^1$, $R^2$, $R^3$ and $R^4$ is independently at least one divalent radical selected from the group consisting of para-phenylene, 2,6-naphthalene, and 4,4'-biphenylene,
$R^5$ is a para- or meta-phenylene radical,
$X^1$ is —NH—,
$X^2$ is —NH—, —O— or

7 Claims, 10 Drawing Sheets

LOW-TEMPERATURE-PROCESSIBLE COPOLYESTERAMIDES, PREPARATION OF MOLDED ARTICLES THEREFROM AND COMPOSITIONS THEREOF

BACKGROUND OF THE INVENTION

1. Field of the Invention

This invention relates to copolyesters and copolyesteramides, methods for the preparation of injection molded articles therefrom, and filled compositions thereof and magnetic compositions thereof.

2. Prior Art

First, liquid crystalline polyester and polyesteramide resins are discussed.

Liquid crystalline polyesters can be injection molded into parts having a number of advantageous properties including a high degree of crystallinity, self-reinforcement effect, mechanical strength, a low coefficient of linear expansion, flame retardancy, chemical resistance, solvent resistance, and a low factor of molding shrinkage.

In particular, all aromatic polyesters having a linear skeleton such as a para-phenylene or 4,4'-biphenylene group are very useful thermoplastic resins also exhibiting improved heat resistance. For example, all aromatic liquid crystalline polyesters consisting solely of a para-hydroxybenzoic acid component have a melting point of about 610° C., and all aromatic liquid crystalline polyesters consisting of hydroquinone and terephthalic acid components have a melting point of about 600° C. U.S. Pat. No. 3,637,595 discloses an all aromatic liquid crystalline polyester which consists of terephthalic acid, para-hydroxybenzoic acid, and 4,4'-biphenol components and has a softening point of higher than about 400° C.

Although these liquid crystalline polyesters are heat resistant, their high melting temperature is a problem. For example, it is impossible in a practical sense to injection mold those polyesters having a melting point of higher than about 600° C. Even the polyester disclosed in U.S. Pat. No. 3,637,595 must be molded at a temperature of higher than about 400° C., which causes degradation or coloring of the resin and requires a special molding machine.

A resin is desired to have a lower melting temperature because of ease of injection molding. However, there is the tendency that resins having a lower melting temperature are less heat resistant. Then the melting temperature of a resin cannot be extremely lowered if its heat resistance is taken into account. It is desired that a liquid crystalline polyester can be molded or processed at a melting temperature in the range of from about 300° C. to about 350° C. which is lower than the degradation starting temperature of the polyester.

Several methods are known for lowering the melting temperature of all aromatic liquid crystalline polyesters in order to eliminate the difficulty of molding as disclosed in Jouranl of Applied Polymer Science, Applied Polymer Symposium, 41, pages 25–33 (1985).

(1) Introduction of a substituent into an aromatic ring

A first method is by introducing such a substituent component as 2-chlorohydroquinone, 2-methylhydroquinone, and 2-phenylhydroquinone.

(2) Introduction of a flexural component

A second method is by introducing a component such as resorcin, isophthalic acid, meta-hydroxybenzoic acid or a component such as 4,4'-dihydroxybiphenyl ether, 2,6-naphthalenedicarboxylic acid, 2,6-naphthalene diol, and 2-hydroxy-6-naphthoic acid.

(3) Introduction of an aliphatic component

A third method is by introducing a component such as bisphenol-A and ethylene glycol.

The monomers used in these methods are rather commercially less available except the metaphenylene group-containing components and aliphatic components. A problem still arises with the introduction of a metaphenylene group-containing component. Only a limited amount of metaphenylene group-containing component can be introduced because a polymer having a high proportion of a metaphenylene group-containing component introduced suffers from a low melting temperature, loss of liquid crystallinity, and a markedly reduced mechanical strength. Therefore, introduction of aliphatic components is an ideal method for lowering the melting temperature of all aromatic liquid crystalline polyesters by using commonly available chemical stocks.

Liquid crystalline polyesters having an aliphatic component introduced therein are disclosed in, for example, Japanese Patent Publication Nos. 56-18016 and 59-13531 and Japanese Patent Application Kokai No. 58-84821. The method disclosed in Japanese Patent Publication No. 56-18016 introduces a polyethylene terephthalate (PET) component containing an ethylene glycol unit as an aliphatic component into a para-hydroxybenzoic acid component. The highest mechanical strength is achieved when the polyester composition contains about 40 mol% of the PET component. The mechanical strength is very low with a higher or lower content of the PET component. The polyesters containing about 40 mol% of the PET component, however, have a heat distortion temperature as low as 70° C. or less. When heat resistance is of great interest, the content of PET component may be lowered, but undesirably at the sacrifice of mechanical strength. Therefore, it is impossible for this method to satisfy both mechanical strength and heat resistance. The presence of PET component in a proportion as high as 40 mol% is disadvantageous in manufacture because it takes a long time for polymerization to proceed at a high temperature and a high vacuum until the molecular weight capable of satisfactory performance is reached.

Japanese Patent Publication No. 59-13531 discloses that about 50 mol% of PET component is introduced so that the resulting polyester may exhibit a satisfactory mechanical strength. This polyester is not regarded commercially useful because its heat distortion temperature is lower than 80° C. The increased content of PET component requires an undesirably long time for polymerization to proceed at a high temperature and a high vacuum.

The polyesters disclosed in Japanese Patent Application Kokai No. 58-84821 are destined for the formation of filaments and films. An approach is made so as to optimize the melting temperature of polyesters for filament spinning or film formatiion. These polyesters have less heat resistance and unsatisfactory mechanical strength when they are injection molded.

When liquid crystalline polyesters are destined for the preparation of injection molded products, it is desired that they have a low melting temperature at which injection molding can be readily carried out, that is, a melting temperature of lower than about 350° C., and as high a heat resistant temperature as possible, that is, a heat distortion temperature in excess of about 170° C.

Liquid crystalline polyesteramides are modified liquid crystalline polyesters having amide bonds introduced therein in addition to ester bonds for the purpose of improving the adhesion, fatigue resistance and reducing the anisotropy of the polyesters. The polyesteramides are disclosed in Japanese Patent Application Kokai Nos.

| | | |
|---|---|---|
| 57-137321, | 57-145123, | 57-172921, |
| 57-177019, | 57-177020, | 57-177021, |
| 58-29820, | 58-01722, | 58-89618, |
| 61-51032, | 61-236819, | 61-236826, |
| 61-236827. | | |

Introduction of amide bonds, however, induces a reduction in thermal stability (an extended exposure at a high temperature results in a loss of mechanical strength), a reduction in weatherability (particularly a reduction of physical properties under the influence of ultraviolet radiation), and an increase of melt viscosity (reduced fluidity adversely affects moldability). The higher the amide content, the more outstanding is this tendency. As opposed to the fact that some useful liquid crystalline polyesters are commercially available at present, it is difficult to produce commercially useful liquid crystalline polyesteramide because of these drawbacks.

Compositions of polyester and polyesteramide have the following problems.

In general, aromatic polyester resins have drawbacks common to liquid crystalline polyesters, that is, they shows marked anisotropy with respect to mechanical strength, coefficient of linear expansion, and mold shrinkage factor.

Liquid crystalline polyesters have the nature known as anistropy that the strength of a melt molded resin in a machine or oriented direction (MD9 is substantially different from that in a transverse direction (TD). Since failure of an injection molded part by an external force generally takes place at the weakest site, cracks occur in a molded part of liquid crystalline polyester in its transverse direction (TD). To improve the practical strength of liquid crystalline polyester, the anisotropy thereof must be mitigated, that is, the TD strength thereof must be increased.

Another drawback of aromatic polyesters is poor mar resistance.

Liquid crystalline polyesteramide resins are improved in the drawbacks of anisotropy common to aromatic polyesters as previously described, but such an improvement is yet insufficient. They also suffer from a marring problem.

Next, magnetic polyester and polyesteramide compositions are described.

Plastic magnets are inferior in magnetic characteristics to sintered magnets, but have the advantages that a number of products can be readily obtained by injection molding, and they are lightweight and can have a complicated shape. Plastic magnets include magnetic powder and binder resins which are usually epoxy resins and polyamide resins such as nylon-6 and nylon-66. Therefore, the mechanical strength and heat resistance of plastic magnets depend on the particular type of resin used as the binder. For example, plastic magnets based on heat resistant epoxy resins have a heat distortion temperature of from 100° to 120° C. and magnets based on nylon have a heat distortion temperature of from 140° to 160° C.

In order that magnetic resin compositions may find a wider variety of applications, it is important to increase the heat resistance of the compositions. In general, a composition comprising a more heat resistant resin are more difficult to mold, losing the advantage of magnetic resin compositions that a number of parts having a complicated shape can be molded.

SUMMARY OF THE INVENTION

A primary object of the present invention is to provide a novel and improved copolyester having a relatively low melting temperature, improved moldability and heat resistance.

A second object of the present invention is to provide a novel and improved copolyesteramide in which an amide group is introduced into a polyester to improve the mechanical strength thereof while maintaining the heat resistance, moldability, flame retardancy, solvent resistance, appearance, a low coefficient of linear expansion, and a low factor of molding shrinkage characteristic of the polyester.

A third object of the present invention is to provide a method for preparing an injection molded article from the copolyester.

A fourth object of the present invention is to provide a method for preparing an injection molded article from the copolyesteramide.

A fifth object of the present invention is to provide a filled copolyester composition.

A sixth object of the present invention is to provide a filled copolyesteramide composition.

A seventh object of the present invention is to provide a magnetic copolyester composition.

An eighth object of the present invention is to provide a magnetic copolyesteramide composition.

The present invention is based on our research on a method for producing from readily available raw materials a liquid crystalline polyester which has improved heat resistance and appearance and is characaterized by a reduction of the otherwise high melting temperature of all aromatic liquid crystalline polyester to a readily moldable range without sacrificing mechanical strength.

According to a first aspect of the present invention, there is provided a copolyester consisting essentially of units (I), (II), (III), and (IV) of the following formulae:

(I)

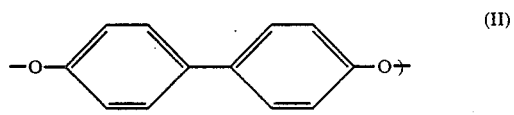

(II)

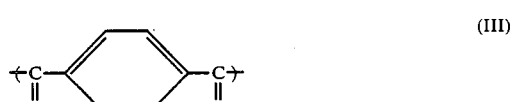

(III)

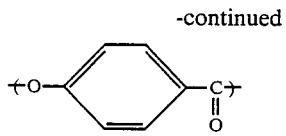 (IV)

in the following molar amounts:

| unit (I) | 3 to 15 mol %, |
|---|---|
| unit (II) | 5 to 30 mol %, and |
| unit (IV) | 30 to 85 mol %, | based on the total molar amount of units (I), (II), (III) and (IV), with the molar ratio of unit (III)/(II) ranging from 8/10 to 11/10.

According to a second aspect of the present invention, there is provided a method for preparing a molded copolyester article, comprising injection molding a copolyester at a melting temperature of from 260° to 350° C., said copolyester consisting essentially of units (I), (II), (III), and (IV) of the following formulae:

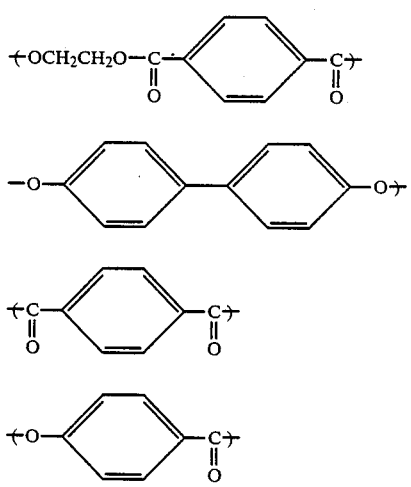

in the following molar amounts:

| unit (I) | 3 to 15 mol %, |
|---|---|
| unit (II) | 5 to 30 mol %, and |
| unit(IV) | 30 to 85 mol %, | based on the total amount of units (I), (II), (III) and (IV), with the molar ratio of unit (III)/(II) ranging from 8/10 to 11/10, thereby obtaining a molded resin having a heat distortion temperature of from 170° to 320° C.

The copolyester according to the first aspect has a relatively low melting temperature, improved moldability and heat resistance and is produced from relatively inexpensive raw materials. Articles injection molded therefrom have the same characteristics.

According to a third aspect of the present invention, there is provided a copolyesteramide consisting essentially of units <I>, <II>, <III>, <IV>, and <V> of the following formulae:

$$-(OCH_2CH_2O-\underset{\underset{O}{\|}}{C}-R^1-\underset{\underset{O}{\|}}{C})- \quad <I>$$

$$-(O-R^2-O)- \quad <II>$$

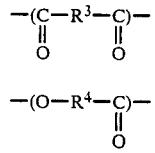 <III>

$$-(O-R^4-\underset{\underset{O}{\|}}{C})- \quad <IV>$$

$$-(X^1-R^5-X^2)- \quad <V>$$

wherein
each of $R^1$, $R^2$, $R^3$ and $R^4$ is independently at least one divalent radical selected from the group consisting of para-phenylene, 2,6-napthalene, and 4,4′-biphenylene,
$R^5$ is a para- or meta-phenylene radical,
$X^1$ is —NH—,
$X^2$ is —NH—, —O—, or

$R^1$ through $R^4$ may be the same or different, and some of the hydrogen atoms on the aromatic rings in $R^1$ through $R^5$ may be replaced by a lower alkyl, halogen, nitro, cyano, or alkoxy radical,
in the following molar amounts:

| unit <I> | 3 to 30 mol %, |
|---|---|
| unit <II> | 5 to 30 mol %, |
| unit <IV> | 30 to 85 mol %, and |
| unit <V> | 0.1 to 10 mol %, | based on the total molar amount of units <I>, <II>, <III>, <IV>, and <V>, with the molar ratio of unit <III>/(<II>+<V>) ranging from 8/10 to 11/10 when $X^2$ is —NH— or —O—, and the molar ratio of unit <III>/<II> ranging from 8/10 to 11/10 when $X^2$ is

According to a fourth aspect of the present invention, there is provided a method for preparing a molded copolyesteramide article, comprising injection molding a copolyesteramide at a melting temperature of from 260° to 350° C., said copolyesteramide consisting essentially of units <I>, <II>, <III>, <IV>, and <V> of the following formulae:

$$-(OCH_2CH_2O-\underset{\underset{O}{\|}}{C}-R^1-\underset{\underset{O}{\|}}{C})- \quad <I>$$

$$-(O-R^2-O)- \quad <II>$$

 <III>

$$-(O-R^4-\underset{\underset{O}{\|}}{C})- \quad <IV>$$

$$-(X^1-R^5-X^2)- \quad <V>$$

wherein
each of $R^1$, $R_2$, $R^3$ and $R^4$ is independently at least one divalent radical selected from the group consisting of para-phenylene, 2,6-naphthalene, and 4,4'-biphenylene,
$R^5$ is a para- or meta-phenylene radical,
$X^1$ is —NH—,
$X^2$ is —NH—, —O—, or

$R^1$ through $R^4$ may be the same or different, and some of the hydrogen atoms on the aromatic rings in $R^1$ through $R^5$ may be replaced by a lower alkyl, halogen, nitro, cyano, or alkoxy radical,
in the following molar amounts:

| | |
|---|---|
| unit <I> | 3 to 30 mol %, |
| unit <II> | 5 to 30 mol %, |
| unit <IV> | 30 to 85 mol %, and |
| unit <V> | 0.1 to 10 mol %, | based on the total molar amount of units <I>, <II>, <III>, <IV>, and <V>, with the molar ratio of unit <III>/(<II>+<V>) ranging from 8/10 to 11/10 when $x^2$ is —NH— or —O—, and the molar ratio of unit <III>/<II> ranging from 8/10 to 11/10 when $X^2$ is

thereby obtaining a molded resin having a heat distortion temperature of from 100° to 280° C.

In the copolyesteramide according to the third aspect, an amide group is introduced into a polyester to improve the mechanical strength thereof while maintaining the heat resistance, moldability, flame retardancy, solvent resistance, appearance, a low coefficient of linear expansion, and a low factor of molding shrinkage characteristic of the polyester. Because of the low content of amide group introduced, the copolyesteramide is substantially free of the above-mentioned drawbacks caused by introduction of amide group.

We have also found that by blending copolyesters or copolyesteramides with inorganic fillers, the drawbacks of these resins in anisotropy and surface marring are improved together with heat resistance and rigidity while maintaining the mechanical strength, heat resistance and moldability characteristic of these resins. Surprisingly, addition of inorganic fillers to these resins does not substantially alter the moldability of the resins.

According to a fifth aspect of the present invention, there is provided a copolyester composition comprising 100 parts by weight of a copolyester consisting essentially of units (I), (II), (III), and (IV) of the following formulae:

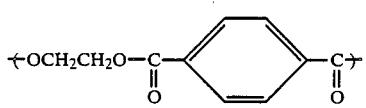 (I)

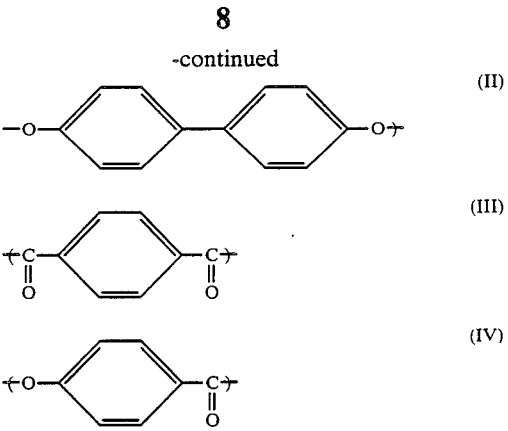

in the following molar amounts:

| | |
|---|---|
| unit (I) | 3 to 15 mol %, |
| unit (II) | 5 to 30 mol %, and |
| unit (IV) | 30 to 85 mol %, | based on the total molar amount of units (I), (II), (III) and (IV), with the molar ratio of unit (III)/(II) ranging from 8/10 to 11/10, and 1 to 400 parts by weight of an inorganic filler.

The copolyester composition has improved heat resistance, moldability, mechanical strength, flame retardancy, chemical resistance, solvent resistance, appearance, a low coefficient of linear expansion, a low factor of molding shrinkage. It is amenable to injection molding, alleviated in anisotropy, and improved in mar resistance.

According to a sixth aspect of the present invention, there is provided a copolyesteramide composition comprising 100 parts by weight of a copolyesteramide consisting essentially of units <I>, <II>, <III>, <IV>, and <V> of the following formulae:

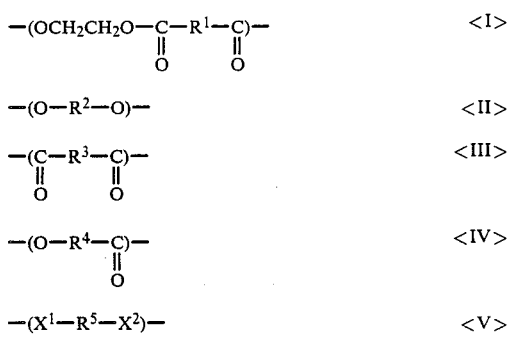

wherein
each of $R^1$, $R_2$, $R^3$ and $R^4$ is independently at least one divalent radical selected from the group consisting of para-phenylene, 2,6-naphthalene, and 4,4'-biphenylene,
$R^5$ is a para- or meta-phenylene radical,
$X^1$ is —NH—,
$X^2$ is —NH—, —O—, or

$R^1$ through $R^4$ may be the same or different, and some of the hydrogen atoms on the aromatic rings in $R^1$ through $R^5$ may be replaced by a lower alkyl, halogen, nitro, cyano, or alkoxy radical,
in the following molar amounts:

| | |
|---|---|
| unit <I> | 3 to 30 mol %, |
| unit <II> | 5 to 30 mol %, |
| unit <IV> | 30 to 85 mol %, and |
| unit <V> | 0.1 to 10 mol %, | based on the total molar amount of units <I>, <II>, <III>, <IV>, and <V>, with the molar of unit <III>/(<II>+<V>) ranging from 8/10 to 11/10 when $X^2$ is —NH— or —O—, and the molar ratio of unit <III>/<II> ranging from 8/10 to 11/10 when $X^2$ is

and 1 to 400 parts by weight of an inorganic filler.

The copolyesteramide composition is characterized by a further alleviation of anisotropy without losing any of the characteristics of the copolyester composition.

According to a seventh aspect of the present invention, there is provided a magnetic resin composition comprising
100 parts by weight of a copolyester consisting essentially of units (I), (II), (III), and (IV) of the following formulae:

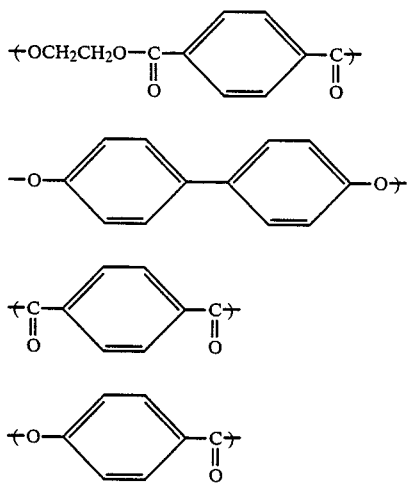

in the following molar amounts:

| | |
|---|---|
| unit (I) | 3 to 15 mol %, |
| unit (II) | 5 to 30 mol %, and |
| unit (IV) | 30 to 85 mol %, | based on the total molar amount of units (I), (II), (III) and (IV), with the molar ratio of unit (III)/(II) ranging from 8/10 to 11/10, and 100 to 1900 parts by weight of a magnetic powder.

According to an eighth aspect of the present invention, there is provided a magnetic resin composition comprising 100 parts by weight of a copolyesteramide consisting essentially of units <I>, <II>, <III>, <IV>, and <V> of the following formulae:

$$-(OCH_2CH_2O-\underset{O}{\underset{\|}{C}}-R^1-\underset{O}{\underset{\|}{C}})- \qquad <I>$$

$$-(O-R^2-O)- \qquad <II>$$

$$-(\underset{O}{\underset{\|}{C}}-R^3-\underset{O}{\underset{\|}{C}})- \qquad <III>$$

$$-(O-R^4-\underset{O}{\underset{\|}{C}})- \qquad <IV>$$

$$-(X^1-R^5-X^2)- \qquad <V>$$

wherein
each of $R^1$, $R^2$, $R^3$ and $R^4$ is independently at least one divalent radical selected from the group consisting of para-phenylene, 2,6-naphthalene, and 4,4'-biphenylene,
$R^5$ is a para- or meta-phenylene radical,
$X^1$ is —NH—,
$X^2$ is —NH—, —O—, or

$R^1$ through $R^4$ may be the same or different, and some of the hydrogen atoms on the aromatic rings in $R^1$ through $R^5$ may be replaced by a lower alkyl, halogen, nitro, cyano, or alkoxy radical,
in the following molar amounts:

| | |
|---|---|
| unit <I> | 3 to 30 mol %, |
| unit <II> | 5 to 30 mol %, |
| unit <IV> | 30 to 85 mol %, and |
| unit <V> | 0.1 to 10 mol %, | based on the total molar amount of units <I>, <II>, <III>, <IV>, and <V>, with the molar ratio of unit <III>/(<II>+<V>) ranging from 8/10 to 11/10 when $X^2$ is —NH— or —O—, and the molar ratio of unit <III>/<II> ranging from 8/10 to 11/10 when $X^2$ is

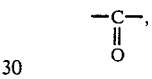

and 100 to 1900 parts by weight of a magnetic powder.

The magnetic resin compositions have improved moldability, heat resistance, strength and modulus because they contain the specific copolyesters or copolyesteramides which have improved heat resistance, high strength and high modulus despite of ease of molding due to low melting temperature and low melt viscosity.

BRIEF DESCRIPTION OF THE DRAWINGS

The above and other objects, features, and advantages of the present invention will be better understood by reading the following description taken in conjunction with the accompanying drawings, in which.

DETAILED DESCRIPTION OF THE INVENTION

Figure 1:
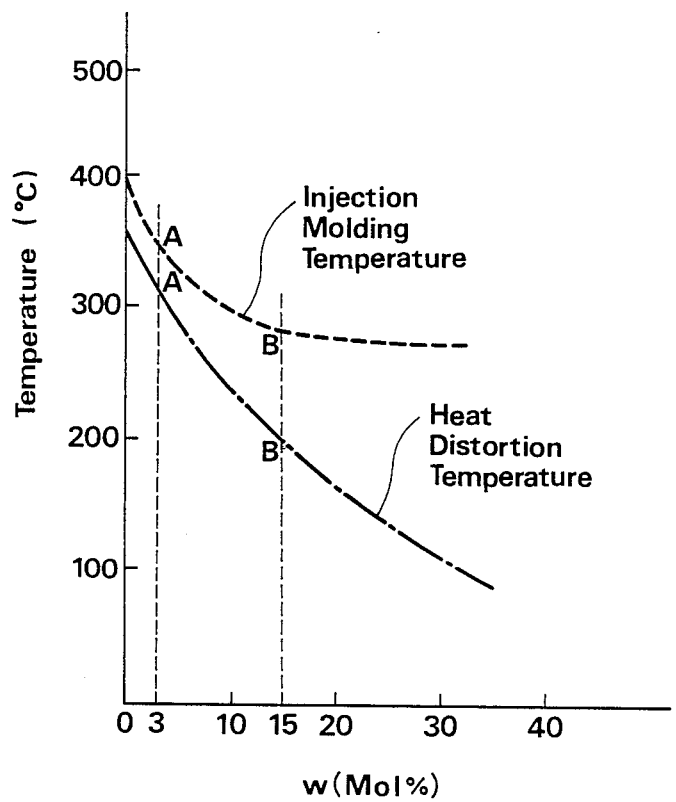
FIG. 1 is a graph showing the heat distortion temperature and injection molding temperature of polyester copolymers as a function of the content of unit (I)

[1] First, the copolyester resin according to the first and second aspects of the present invention is described in detail.

The copolyester consists essentially of units (I), (II), (III), and (IV) as defined above.

(a) Unit (I) is represented by the formula:

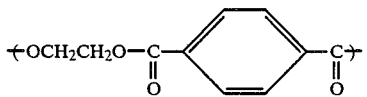

This unit can be introduced in a copolyester by starting with a polyethylene terephthalate having recurring units represented by the formula to form the polyester copolymer.

Unit (I) should be present in an amount of 3 to 15 mol% based on the total molar number of units (I), (II), (III), and (IV). A copolyester containing less than 3 mol% of unit (I) has a too high melting temperature to mold. The presence of more than 15 mol% of unit (I) has the advantage that the melting temperature is lowered to facilitate molding, but undesirably reduces the heat resistance of the resulting copolyester. Preferably, unit (I) is present in an amount of 5 to 10 mol%.

(b) Unit (II) is represented by the formula:

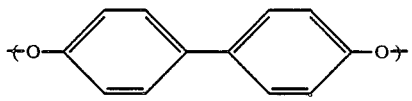

This unit can be introduced into a copolyester by using 4,4'-biphenol or a derivative thereof as a starting monomer.

Unit (II) should be present in an amount of 5 to 30 mol% based on the total molar number of units (I), (II), (III), and (IV). A copolyester containing less than 5 mol% or more than 30 mol% of unit (II) has a low mechanical strength. Preferably, unit (II) is present in an amount of 7 to 20 mol%.

(c) Unit (III) is represented by the formula:

This unit can be introduced into a copolyester by using terephthalic acid or a derivative thereof as a starting monomer.

Unit (III) should be present in such a molar amount that the molar ratio of unit (III)/(II) ranges from about 8/10 to about 11/10. Outside this range, the resulting polyester experiences a loss of heat resistance or mechanical strength, or coloring.

(d) Unit (IV) is represented by the formula:

This unit can be introduced into a copolyester by using a para-hydroxybenzoic acid or a derivative thereof as a starting monomer.

Unit (IV) should be present in an amount of 30 to 85 mol% based on the total number of units (I), (II), (III), and (IV). A copolyester containing less than 30 mol% or more than 85 mol% of unit (IV) has a markedly low mechanical strength. Preferably, unit (IV) is present in an amount of 40 to 80 mol%.

A modified unit (I), (II) or (IV) having the para-phenylene moiety replaced by a meta-phenylene group and/or a modified unit (I), (III) or (IV) having a hydrogen atom on the para-phenylene group replaced by such a substituent as a lower alkyl and halogen may be present as long as the heat resistance and mechanical strength of the resulting copolyester are not significantly altered, that is, in an amount of not more than 5 mol%.

In preparing the copolyester of the present invention, ether bonds are often formed through side reaction in addition to ester bonds. Such an ether bond may be present as long as the heat resistance and mechanical strength of the resulting copolyester are not significantly altered, that is, in an amount of not more than 5 mol%.

In forming the copolyester of the present invention, the polymerization method is not critical. Any desired polymerization method may be used insofar as units (I) through (IV) are present in the resulting polyester copolymer in the specific proportion. Useful are:

a direct polymerization method comprising adding a catalyst to polyethylene terephthalate corresponding to unit (I), biphenol corresponding to unit (II), terephthalic acid corresponding to unit (III), and para-hydroxybenzoic acid corresponding to unit (IV), and heating the mixture for polymerization while removing the water thus formed;

a method comprising heating a mixture of the same starting materials as used in the direct polymerization method except that those having a carboxyl group are previously esterified with a phenol derivative, while removing the phenol derivative thus released;

a method comprising heating a mixture of the same starting materials as used in the direct polymerization method except that those having an aromatic hydroxyl group are previously acylated with an organic acid, while removing the organic acid thus released; and a method comprising heating a mixture of the same starting materials as used in the direct polymerization method except that a carboxyl group on the starting materials is replaced by an acid halide, while removing the hydrogen halide thus formed.

Most desirable is the third method of carrying out polymerizing while removing organic acid.

Polymerization reaction can be carried out in the absence of a catalyst although a catalyst is preferably used to promote polymerization reaction. The catalyst may be previously mixed in the starting material of polyester or separately added at a polymerization stage. Examples of the catalyst used herein include germanium compounds such as germanium oxide; tin compounds such as stannous oxalate, stannous acetate, dialkyl tin oxides, and diaryl tin oxides; titanium compounds such as titanium dioxide, titanium alkoxides, and alkoxy titanium silicates; cobalt compounds such as cobalt acetate; antimony compounds such as antimony trioxide; metal salts of organic acids such as sodium acetate, potassium acetate, calcium acetate, zinc acetate, and ferrous acetate; Lewis acids such as $BF_3$ and $AlCl_3$; and inorganic acids such as hydrochloric acid and sulfuric acid.

The copolyester of the present invention may contain an additive which can be added to the polyester copolymer during or after polymerization. The additives include inorganic fillers such as talc, calcium carbonate, mica, wollastonite, ferrite, and rare earth magnet powder; glass fibers; carbon fibers; asbestos fibers; antioxidants; anti-coloring agents; stabilizers; UV-absorbers; plasticizers; lubricants such as molybdenum disulfide, silicone oil, fluoro resin, and graphite; and flame retardants such as tetrabromobisphenol-A and antimony trioxide.

The copolyester of the present invention will find applications as precision injection molded parts for electrical and mechanical assemblies by taking advantage of mechanical and dimensional properties thereof, plastic magnets by filling the resin with ferrite or rare earth magnet powder, high strength high modulus fibers by melt spinning the resin, and films.

The copolyester of the present invention is most preferably used as an injection molded article prepared by the method according to the second aspect of the present invention because the injection molded article can take advantage of both the low melting temperature and high heat resistance (or heat distortion temperature) of the copolyester.

According to the second aspect of the present invention, there is provided a method for preparing a molded copolyester, comprising heating a copolyester consisting essentially of the above-defined units (I) to (IV) in the above-specified proportion, preferably after comminuting, at a temperature of 260° to 350° C. into a molten liquid crystalline state, and injection molding the molten liquid crystalline copolyester into an article having a heat distortion temperature of 170° to 320° C.

A melting temperature in excess of 350° C. causes coloring and degradation of the resin and makes it difficult to mold the resin through a conventional injection molding machine.

The copolyester of the present invention is not only excellent in every aspect of mechanical strength, heat resistance and moldability, but also satisfies the industrial requirements of availability of starting materials for commercial production and ease of polymerization reaction.

The copolyesters and articles injection molded therefrom according to the present invention have the following features.

(1) It is critical that the copolyester of the present invention consists essentially of unit (I) of ethylene terephthalate component, unit (II) of biphenol component, unit (III) of terephthalic acid component, and unit (IV) of para-hydroxybenzoic acid component.

Unit (I)-forming components other than the ethylene trephthalates are less available. Those components having an aliphatic moiety with a greater number of carbon atoms such as propylene terephthalate and butylene terephthalate adversely affect heat resistance and mechanical strength. Ethylene-2,6-naphthalene dicarboxylate and similar components also adversely affect heat resistance and are thus impractical.

Aromatic dihydroxy components other than the biphenols are impractical because the resulting copolymer has a low mechanical strength, low heat resistance or poor moldability. For example, when a hydroquinone component is used as disclosed in Japanese patent application Kokai No. 58-84821, the resulting polyester copolymer is very brittle and mechanically weak. The use of nuclearly substituted hydroquinone and 2,6-naphthalene diol components results in impractical injection molded articles having an extremely reduced heat resistance.

Aromatic dicarboxylic acid components other than the terephthalic acids are not easily available and also adversely affect either heat resistance or mechanical strength. For example, the isophthalic acids reduce the mechanical strength and heat resistance and the 2,6-naphthalene dicarboxylic acids reduce the heat resistance.

Aromatic hydroxycarboxylic acid components other than the para-hydroxybenzoic acids also adversely affect heat resistance and mechanical strength. For example, the meta-hydroxybenzoic acids result in mechanically weak copolymers and the 2-hydroxy-6-naphthoic acids reduce the heat resistance.

(2) The copolyester of the present invention reaches a sufficient molecular weight to ensure a satisfactory mechanical strength within a short period of polymerization. Brief polymerization is not only advantageous to produce, but also results in a copolymer having improved appearance because degradation, thermal deterioration and coloring are minimized. For example, the method disclosed in Japanese Patent Publication No. 59-13531 requires a polymerization time of more than 2 hours in vacuum whereas the copolyester of the present invention can be prepared within about 10 to 20 minutes under similar conditions. The copolyester thus formed is little colored and presents an aesthetic appearance.

(3) The heat resistance of the copolyester of the present invention depends on the content of unit (I), but does not largely depend on the content of units (II), (III) and (IV).

FIG. 1 is a graph showing how the heat resistance and moldability of a copolyester depends on the content of unit (I). There were prepared copolyesters shown below consisting of w mol% of unit (I), units (II) and (III) in a molar ratio of unit (III)/(II) equal to 1, and 65 mol% of unit (IV), which were injection molded to determine an injection molding temperature and a heat distortion temperature. The injection molding and heat distortion temperatures are plotted in FIG. 1 as a function of the content of unit (I), w on the abscissa.

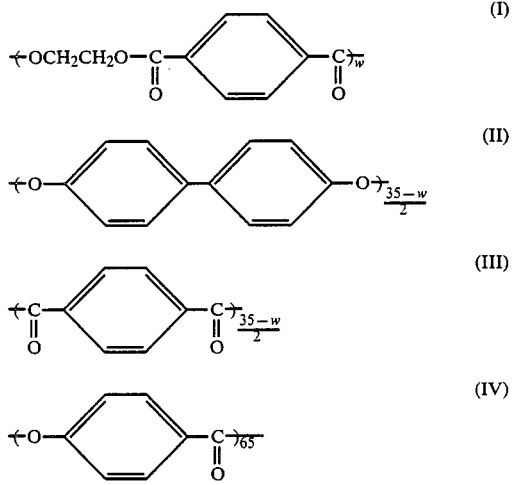

The copolyesters of the present invention fall within segments A-B in FIG. 1. The copolyesters are molded at a molding temperature in the range between 260° C. and 350° C. which temperature range is generally employed for ordinary injection molding and thus easy to mold whereas their heat resistance is excellent because the heat distortion temperature is as high as about 170° C. to about 320° C.

It is to be understood that the molding temperature shown in FIG. 1 is a temperature at which the resin can be readily injection molded under an ordinary pressure. The resin can be molded at a temperature lower by about 30° C. than the indicated temperature if the injection molding pressure is raised. Outside the scope of the present invention, that is, when w exceeds 15 mol%, the molding temperature is not noticeably lowered, but the heat resistance is drastically reduced to an impractical level where injection molded articles find a limited range of application. When w is less than 3 mol%, the injection molding temperature exceeds the practical level of 350° C.

(4) The content of unit (I) is relatively low in the copolyester of the present invention. The low content of unit (I) ensures to produce a highly homogeneous copolyester without forming high-melting particles as seen in the copolyesters disclosed in Japanese Patent Publication Nos. 56-18016 and 59-13531.

The copolyesteramide resin according to the third and fourth aspects of the present invention is described in detail.

The copolyesteramide consists essentially of units $<I>$, $<II>$, $<III>$, $<IV>$ and $<V>$ as defined above.

(a) Unit $<I>$ is represented by the formula:

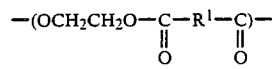

wherein $R^1$ is a divalent radical selected from the group consisting of para-phenylene, 2,6-naphthalene, and 4,4'-biphenylene radicals, $R^1$ may be the same radical or two or more different radicals in a molecule, and some of the hydrogen atoms on the aromatic rings of $R^1$ may be replaced by a substituent selected from the group consisting of lower alkyl, halogen, nitro, cyano, and alkoxy radicals.

Preferably $R^1$ is a para-phenylene or 2,6-naphthalene radical because the starting material is readily available.

Preferably unit $<I>$ is introduced into the polymer by starting with a polyester having recurring units of the above formula. Examples of the starting polyester include polyethylene terephthalate and polyethylene 2,6-naphthoate.

Unit $<I>$ should be present in an amount of 3 to 30 mol% based on the total molar number of units $<I>$, $<II>$, $<III>$, $<IV>$, and $<V>$. A copolyesteramide containing less than 3 mol% of unit $<I>$ has a too high melting temperature to mold. The presence of more than 30 mol% of unit $<I>$ has the advantage that the melting temperature is lowered to facilitate molding, but undesirably reduces the heat resistance of the resulting copolyesteramide. Preferably, unit $<I>$ is present in an amount of 5 to 20 mol%.

Figure 2:
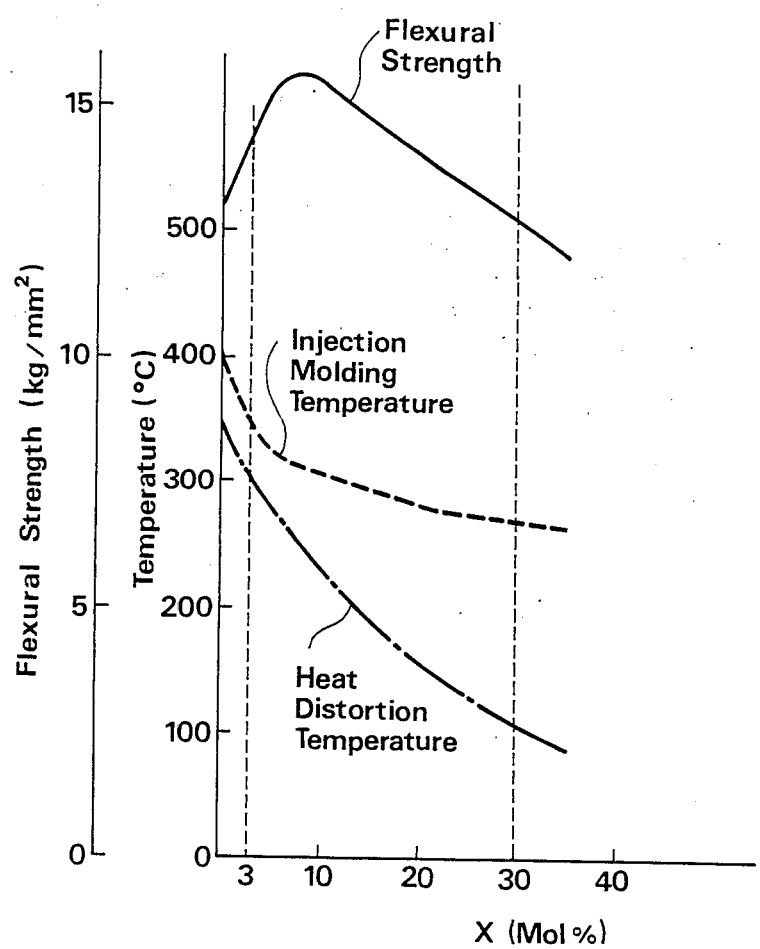
FIG. 2 is a graph showing the mechanical and thermal properties of polyesteramide copolymers as a function of the content of unit <I>.

FIG. 2 illustrates why the content of unit $<I>$ is limited to the range.

More particularly, copolymeric polyesteramide resins of the following formula:

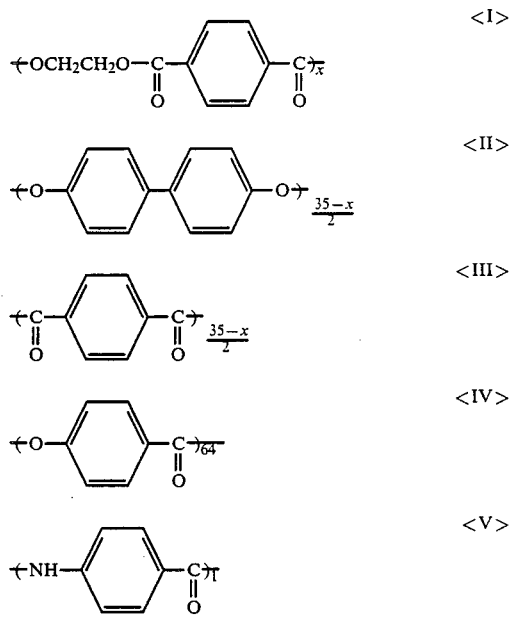

were prepared with varying contents of unit $<I>$, x (mol%). The resins were injection molded to determine their mechanical properties, injection molding temperature and heat distortion temperature. These data are plotted in FIG. 2 as a function of the content of unit $<I>$, x on the abscissa which is represented in the above formula. An acceptable profile of flexural strength, injection molding temperature and heat distortion temperature is obtained when x is in the range of from 3 to 30 mol%.

(b) Unit <II> is represented by the formula:

—O—R²—O— wherein R² is a divalent radical selected from the group consisting of para-phenylene, 2,6-naphthalene, and 4,4'-biphenylene radicals, R² may be the same radical or two or more different radicals in a polymer molecule, and some of the hydrogen atoms on the aromatic rings of R² may be replaced by a substituent selected from the group consisting of lower alkyl, halogen, nitro, cyano, and alkoxy radicals.

Preferably R² is a para-phenylene, 2-methyl-para-phenylene, 2-chloro-para-phenylene, 2-phenyl-para-phenylene, 4,4'-biphenylene or 2,6-naphthalene radical because the starting material is readily available.

Unit <II> should be present in an amount of 5 to 30 mol% based on the total molar number of units <I>, <II>, <III>, <IV>, and <V>. A copolyesteramide containing less than 5 mol% or more than 30 mol% of unit <II> exhibits a reduced mechanical strength. Preferably, unit <II> is present in an amount of 8 to 20 mol%.

(c) Unit <III> is represented by the formula:

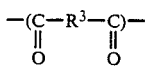

wherein R³ is a divalent radical selected from the group consisting of para-phenylene, 2,6-naphthalene, and 4,4'-biphenylene radicals, R³ may be the same radical or two or more different radicals in a polymer molecule, and some of the hydrogen atoms on the aromatic rings of R³ may be replaced by a substituent selected from the group consisting of lower alkyl, halogen, nitro, cyano, and alkoxy radicals.

The content of unit <III> largely depends on the type and content of unit <V> which will be described later. Unit <III> is present in an amount such that the molar ratio of unit <III>/(<II>+<V>) is in the range of from 8/10 to 11/10 when X² in unit <V> is —NH— or —O—, and the molar ratio of unit <III>/<II> is in the range of from 8/10 to 11/10 when X² is

Outside this molar ratio range, the resulting copolymers are undesirably reduced in mechanical strength and heat resistance and colored.

Figure 3:
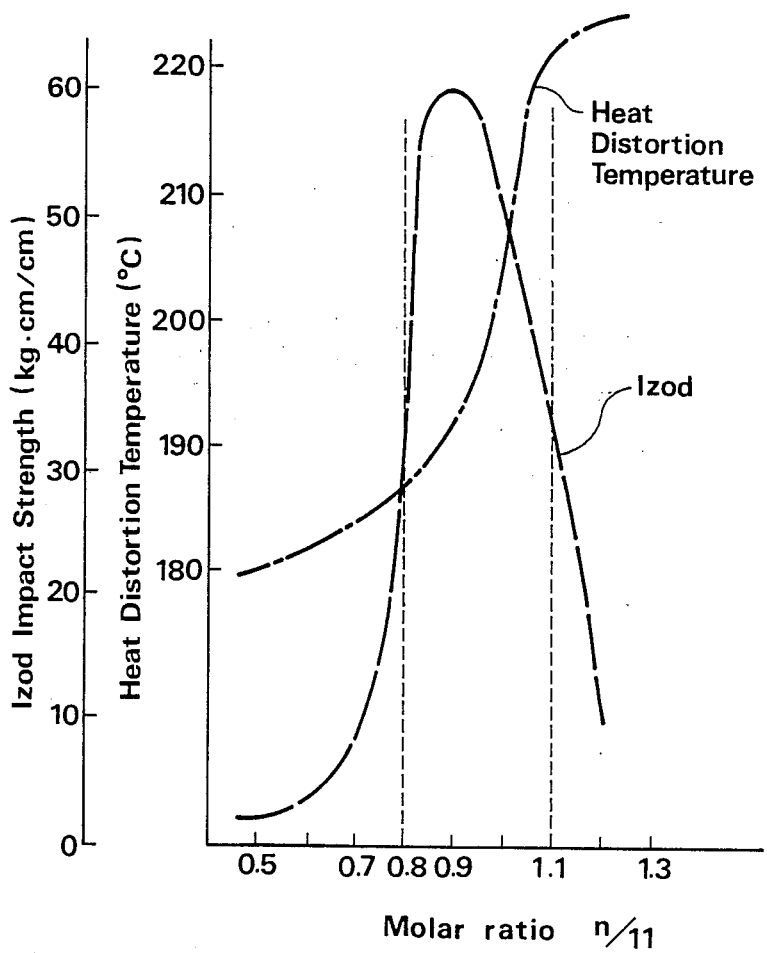
FIG. 3 is a graph showing the heat distortion temperature and Izod impact strength of polyesteramide copolymers as a function of the molar ratio of unit <III>/<II>.

FIG. 3 illustrates why the content of unit <III> is limited to the range.

More particularly, copolymeric polyesteramide resins of the following formula:

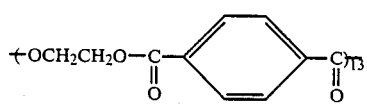 <I>

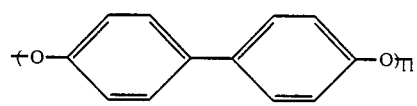 <II>

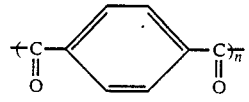 <III>

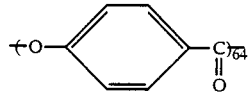 <IV>

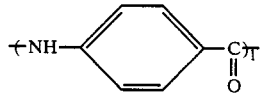 <V> were prepared with varying contents of unit <III>, n (the molar content). It is seen that X² in unit <V> is

The resins were injection molded to determine their mechanical properties and heat distortion temperature. These data are plotted in FIG. 3 as a function of n/11 on the abscissa which represents the molar ratio of unit <III> to unit <II> in the above formula.

Figure 4:
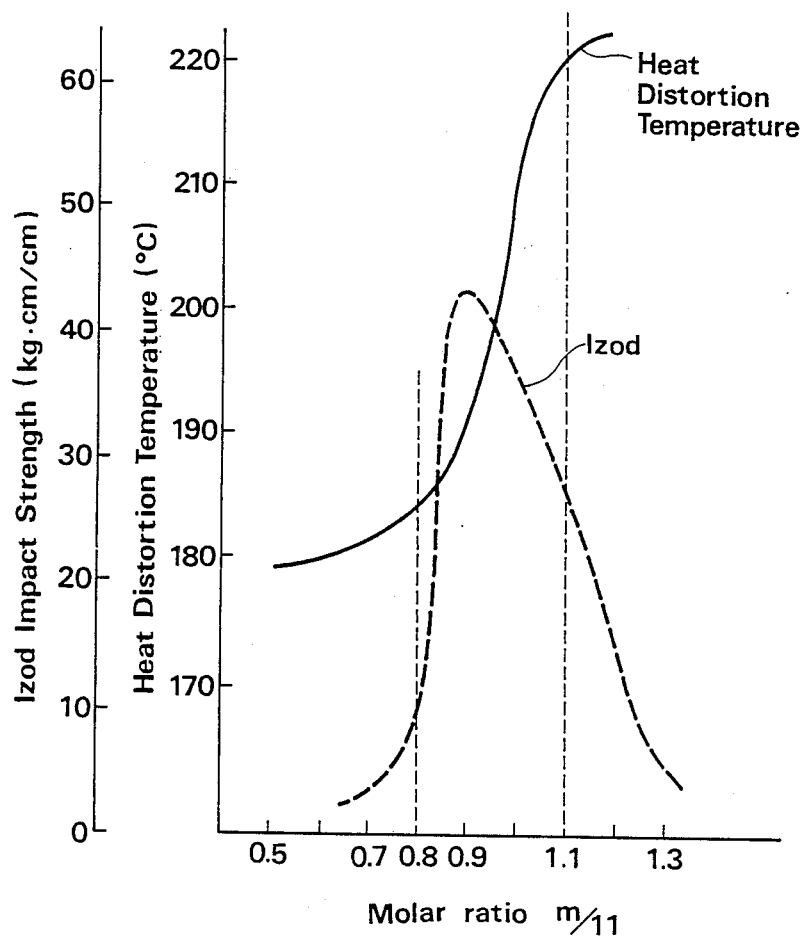
FIG. 4 is a graph showing the heat distortion temperature and Izod impact strength of polyesteramide copolymers as a function of the molar ratio of unit <III>/(<II>+<V>).

FIG. 4 shows the Izod impact strength and heat distortion temperature of copolymers wherein X² in unit <V> is —O— as a function of the molar ratio of unit <III>/(<II>+<V>). More particularly, copolymeric polyesteramide resins of the formula:

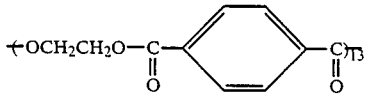 <I>

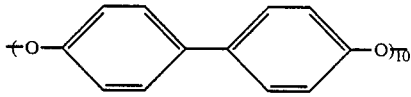 <II>

 <III>

 <IV>

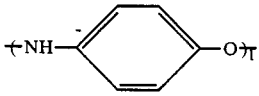 <V> were prepared with varying contents of unit <III>, m (the molar content). The resins were injection molded to determine their mechanical property and heat distortion temperature. These data are plotted in FIG. 4 as a function of m/11 on the abscissa which represents the molar ratio of unit <III>/(<II>+<V>) in the above formula.

These graphs well account for the limitation of the content of unit <III> to the above-defined molar ratio ranges.

(d) Unit <IV> is represented by the formula

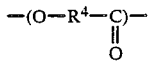

wherein $R^4$ is a divalent radical selected from the group consisting of para-phenylene, 2,6-naphthalene, and 4,4'-biphenylene radicals, $R^4$ may be the same radical or two or more different radicals in a polymer molecule, and some of the hydrogen atoms on the aromatic rings of $R^4$ may be replaced by a substituent selected from the group consisting of lower alkyl, halogen, nitro, cyano, and alkoxy radicals.

Unit <IV> should be present in an amount of 30 to 85 mol% based on the total molar number of units <I>, <II>, <III>, <IV>, and <V>. A copolyesteramide containing less than 30 mol% or more than 85 mol% of unit <IV> exhibits a reduced mechanical strength. Preferably, unit <IV> is present in an amount of 40 to 80 mol%.

Figure 5:
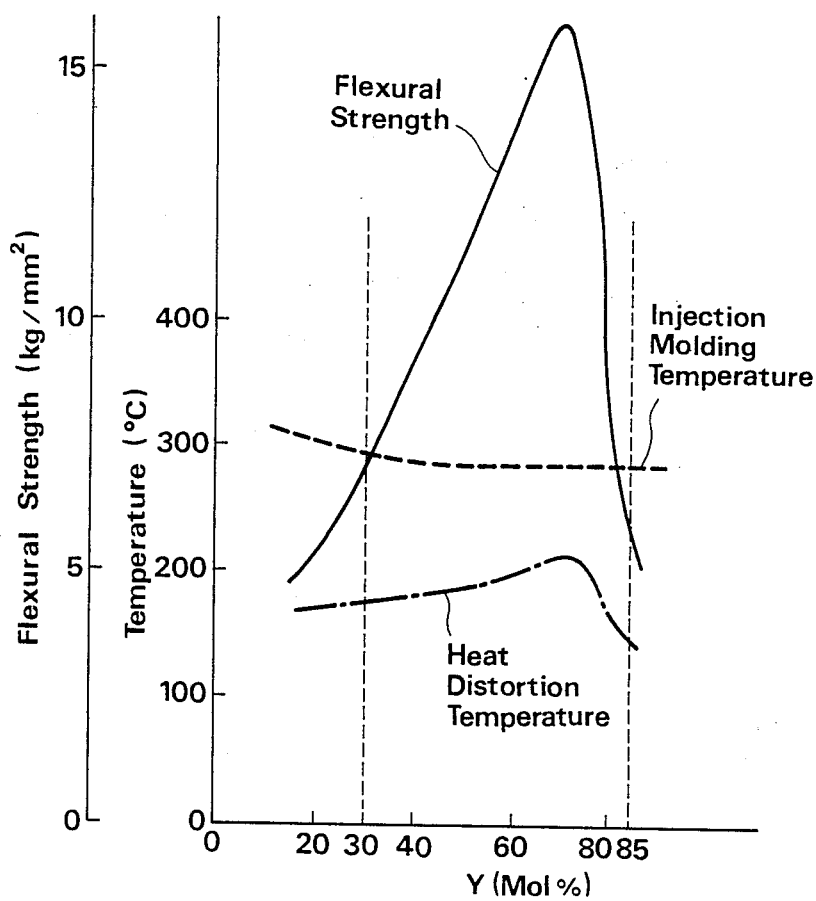
FIGS. 5 and 6 are graphs showing the mechanical and thermal properties of polyesteramide copolymers as a function of the content of unit <IV>.
Figure 6:
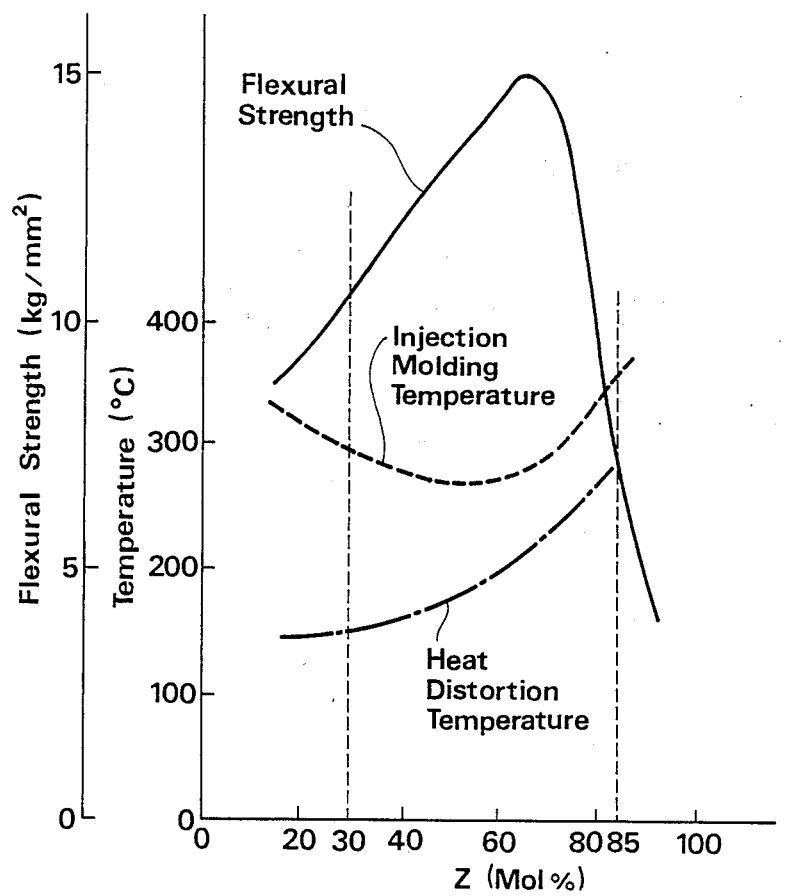
Figure 7:
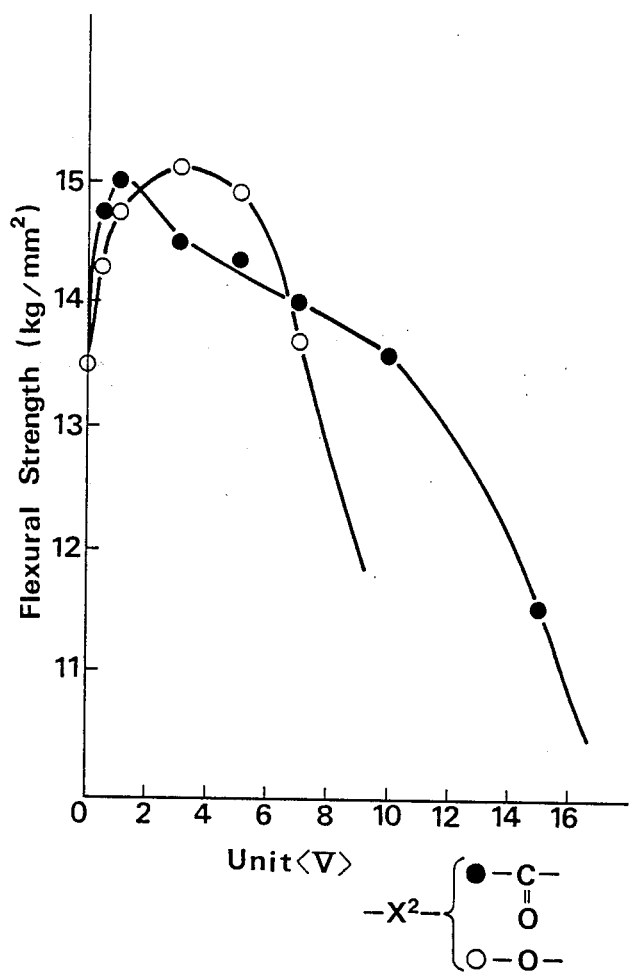
FIG. 7 is a graph showing the flexural strength of polyesteramide copolymers as a function of the content of unit <V>.
Figure 8:
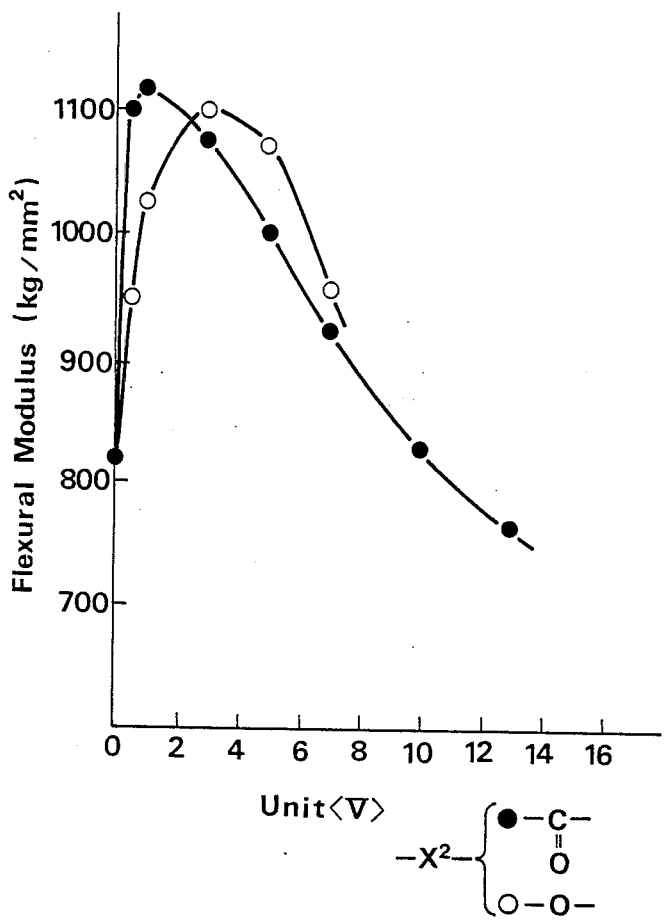
FIG. 8 is a graph showing the flexural modulus of polyesteramide copolymers as a function of the content of unit <V>.
Figure 9:
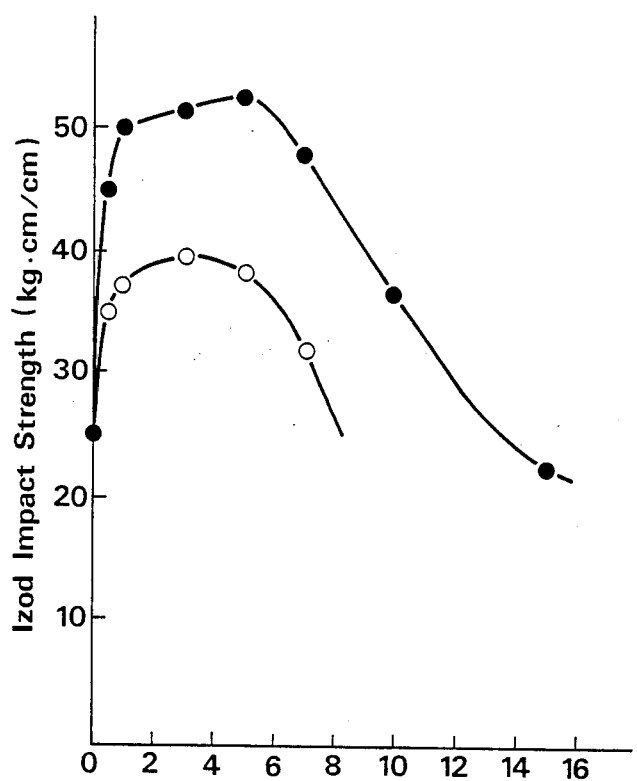
FIG. 9 is a graph showing the Izod impact strength of polyesteramide copolymers as a function of the content of unit <V>.
Figure 10:
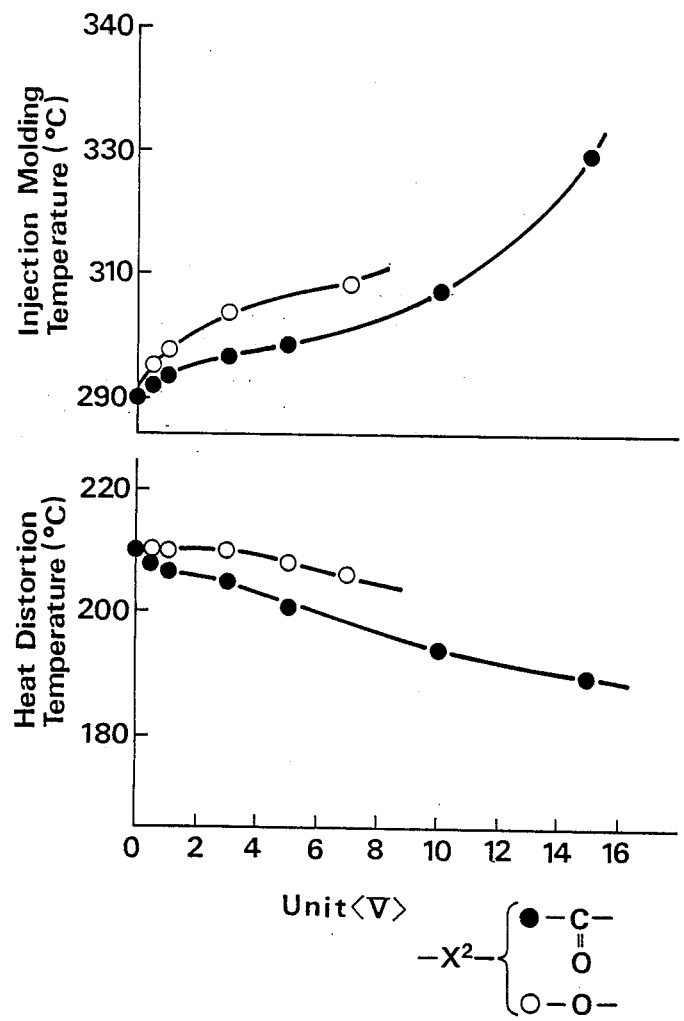
FIG. 10 is a graph showing the heat distortion temperature and injection molding temperature of polyesteramide copolymers as a function of the content of unit <V>.

FIGS. 5 and 6 illustrate why the content of unit <IV> is limited to the range.

More particularly, copolymeric polyesteramide resins of the following formula:

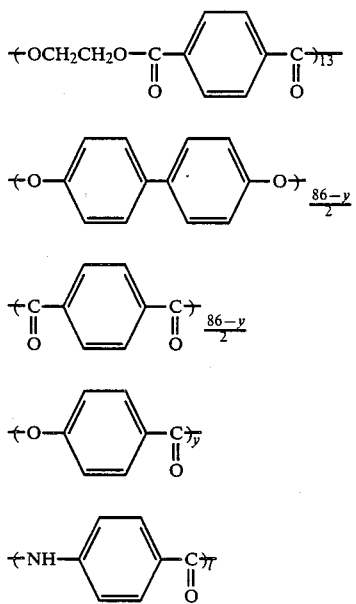

and

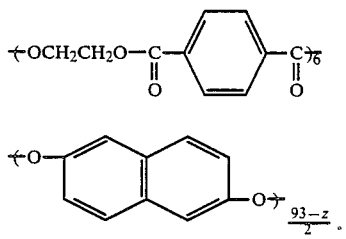

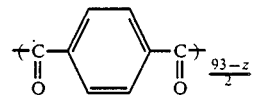

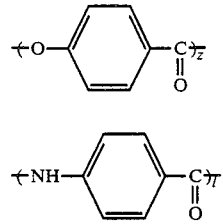

were prepared with varying contents of unit <IV>, y and z (mol%). The resins were injection molded to determine their mechanical properties, injection molding temperature and heat distortion temperature. These data are plotted and heat distortion temperature. These data are plotted in FIGS. 5 and 6 as a function of the content of unit <IV>, y and z on the abscissa.

An acceptable balance is seen among flexural strength, injection molding temperature and heat distortion temperature when y or z is in the range of from 30 to 85 mol%.

(e) Unit <V> is represented by the formula:

$$-X^1-R^5-X^2-$$

wherein
$R^5$ is a para- or meta-phenylene radical,
$X^1$ is —NH—, and
$X^2$ is —NH—, —O— or

Some of the hydrogen atoms on the aromatic rings of $R^5$ may be replaced by a substituent selected from the group consisting of lower alkyl and halogen radicals. $R^5$ may be the same radical or two or more different radicals in a polymer molecule.

Unit <V> should be present in an amount of 0.1 to 10 mol% based on the total molar number of units <I>, <II>, <III>, <IV>, and <V>. Less than 0.1 mol% of unit <V> is not effective in improving mechanical strength by the introduction of an amide group. The presence of more than 10 mol% of unit <V> raises the melting temperature and viscosity to adversely affect molding and reduces heat resistance, mechanical strength and modulus. Preferably, unit <V> is present in an amount of 0.3 to 7 mol%.

FIGS. 7 through 10 show why the content of unit <V> is limited to the range.

More particularly, as will be later described in Example 1, polyesteramide copolymers were prepared in which the contents of units <I>, <II>, and <III> were fixed and the contents of unit <IV> and unit <V> wherein $X^2$ is

, were varied. The resins were injection molded to determine their mechanical properties, heat distortion temperature, and injection molding temperature. The data are plotted in FIGS. 7 through 10.

Also, as will be later described in Example 2, polyesteramide copolymers were prepared in which the contents of units <I>, <III>, and <IV> were fixed and the contents of unit <II> and unit <V> wherein $X^2$ is —O— were varied. The resins were injection molded to determine their properties. The data are also plotted in FIGS. 7 through 10.

Units <I> through <V> are introduced into a polyesteramide copolymer by using starting materials corresponding to the respective units, that is, a polyester, an aromatic diol or a derivative thereof, an aromatic dicarboxylic acid or a derivative thereof, an aromatic hydroxycarboxylic acid or a derivative thereof, a meta- or para-phenylene diamine or a derivative thereof, a meta- or para-aminophenol or a derivative thereof, and a meta- or para-aminobenzoic acid or a derivative thereof.

In forming the copolyesteramide of the present invention, the polymerization method is not critical. Any desired polymerization method may be used insofar as units <I> through <V> are present in the resulting polyesteramide copolymer in the specific proportion. Useful are:

a direct polymerization method comprising heating a mixture of appropriate monomers for polymerization without modifying their hydroxyl, carboxyl and amino groups while removing the water thus formed;

a polymerization method comprising heating a mixture of the same monomers as used in the direct polymerization method except that hydroxyl and amino groups of certain monomers are previously acylated, while removing the corresponding organic acid released;

a polymerization method comprising heating a mixture of the same starting materials as used in the direct polymerization method except that a carboxyl group of a certain monomer or monomers is previously esterified with a phenol, while removing the corresponding phenol released; and a polymerization method comprising heating a mixture of the same starting materials as used in the direct polymerization method except that a carboxyl group of a certain monomer or monomers is previously converted into an acid halide, while removing the corresponding hydrogen halide.

Any desired polymerization technique may be used including melt polymerization, heat solution polymerization, low-temperature solution polymerization, and interfacial polymerization.

To avoid redundancy, a melt polymerization method of carrying out polymerization through acidolysis reaction is described as a typical example.

A polymerization reactor is charged with necessary starting materials, namely, a polyester, an aromatic diacyloxy compound, an aromatic dicarboxylic acid, an aromatic acyloxycarboxylic acid, and an aromatic acyloxyacylamino (and/or an aromatic diacylamino compound and/or an aromatic acylaminocarboxylic acid) compound. Reaction is initiated by heating the contents.

The polymerization temperature is not critical although polymerization is generally carried out at a temperature between 180° L C. and 400° C. Reaction proceeds slowly at a temperature of lower than 180° C. A polymer will undergo coloration or degradation at a temperature of higher than 400° C. The preferred polymerization temperature is in the range of from 200° to 360° C.

The pressure under which reaction is carried out is not critical. Preferably, the pressure is approximate to the atmospheric pressure at an initial stage of polymerization and then gradually reduced with the progress of polymerization.

Reaction is preferably carried out with stirring. The atmosphere of a reaction system is desirably an inert gas such as nitrogen and argon.

The reaction of the present invention can be carried out in the absence of a catalyst although the use of a catalyst is effective to promote polymerization reaction. The catalyst may be mixed with one of the starting materials, the polyester of unit <I> or added at a polymerization stage.

The catalysts used herein are the same as previously described in conjunction with the copolyester.

An additive may be added either to a reaction mixture at an intermediate stage of the polymerization process or to an eventually formed resin. The additives used herein are the same as previously described in conjunction with the copolyester.

The copolyesteramide resin of the present invention may be used in the same applications as previously described in conjunction with the copolyester.

The copolyesteramide of the present invention is most preferably used as an injection molded article prepared by the method according to the fourth aspect of the present invention because the injection molded article can take advantage of both the low melting temperature and high heat resistance (or heat distortion temperature) of the copolyesteramide.

According to the fourth aspect of the present invention, there is provided a method for preparing a molded copolyesteramide, comprising heating a copolyesteramide consisting essentially of the above-defined units <I> to <V> in the above-specified proportion, preferably after comminuting, at a temperature of 260° to 350° C. into a molten liquid crystalline state, and injection molding the molten liquid crystalline copolyester into an article having a heat distortion temperature of 100° to 280° C.

A melting temperature in excess of 350° C. causes coloring and degradation of the resin and makes it difficult to mold the resin through a conventional injection molding machine.

Now, the copolyesteramide of the present invention is compared with the conventional polyesteramides described in the literature.

All aromatic polyesteramides which consist of units <II> through <V> and are free of unit <I> are described in, for example, Japanese Patent Application Kokai Nos. 57-172921, 57-177019, 57-177020, 57-177021, 58-1722, and 61-51032. These liquid crystalline polyesteramides are characterized by improvements in the adhesion, fatigue resistance, anisotropy and strength of the corresponding liquid crystalline polyesters.

To achieve these improvements, it is critical that at least 5 mol% of an aromatic amine component be present. Because of the relatively high content of aromatic amine component, the resins often suffer from several drawbacks including coloring (yellow to brown), thermal deterioration, ultraviolet deterioration, poor moldability due to an increased melt viscosity, and reduced heat resistance.

In contrast, the copolyesteramide of the present invention has a a relatively low content of an aromatic amine component. Thus it is markedly improved in mechanical strength and suffers from few of the drawbacks attributable to the amine component.

Polyesteramides consisting of units <I> and <V> are disclosed in U.S. Pat. No. 4,182,842. They have the drawbacks attributable to the amine component and a low heat resistance (heat distortion temperature).

The copolyesteramides of the present invention have the following features.

(1) Although conventional polyesteramides are colored in yellow to brown, the polyesteramide of the present invention is little colored and appears approximately white.

(2) The heat resistance of the polyesteramide of the present invention largely depends on the content of unit <I> as evident from FIG. 2 showing a typical example. Outside the scope of the present invention, that is, with less than 3 mol% of unit <I>, the resulting resin is difficult to mold because it can be injection molded only at a temperature of higher than about 350° C. at which the resin is liable to coloring and thermal degradation. The presence of more than 30 mol% of unit <I> is deleterious to the resin with respect to heat resistance because the heat distortion temperature is lowered to below 100° C.

(3) The polyesteramide of the present invention can be molded in the temperature range of from 260° C. to 350° C. which is generally employed in ordinary injection molding techniques. Despite ease of molding, the present polyesteramide is fully heat resistant as demonstrated by a heat distortion temperature as high as 100° to 280° C. Particularly, a resin molding having excellent heat resistance as demonstrated by a heat distortion temperature of 230° to 280° C. is obtained at a commonly used injection molding temperature between 300° C. and 320° C. when the content of unit <I> is in the range between 5 and 10 mol% as evident from FIG. 2. Like the resins shown in FIG. 10, conventional liquid crystalline polyesteramides have the tendency that the difference between injection molding temperature and heat distortion temperature increases with the increasing content of amide component, that is, moldability is adversely affected and heat resistance is lowered with the increasing amide content.

[2] The composition according to the fifth aspect of the present invention is a composition comprising a copolyester as defined in [1] and an effective amount of an inorganic filler.

The composition according to the sixth aspect of the present invention is a composition comprising a copolyesteramide as defined in [1] and an effective amount of an inorganic filler.

The inorganic fillers used herein include talc, calcium carbonate including heavy, light and sol forms, mica, barium sulfate, calcium silicate, clay, magnesium carbonate, wollastonite, alumina, silica, iron oxide, calcium sulfate, glass fibers, glass beads, glass powder, glass microbaloons, white carbon, silica sand, quartzite, carbon black, aluminum hydroxide, magnesium hydroxide, calcium hydroxide, zinc oxide, white lead, basic magnesium carbonate, asbestos, zeolite, molybdenum, titanium oxide, diatomaceous earth, sericite, sirasu, graphite, calcium sulfite, gypsum fibers, carbon fibers, ground quartz, bentonite, metal whiskers, sodium sulfate, and mixtures thereof.

Preferred among them are plate fillers such as talc and mica, fibrous fillers such as glass fibers and gypsum fibers, needle fillers such as wollastonite, ground quartz and glass powder, and colloid fillers such as precipitated calcium carbonate having an average grain size of less than 1.0 $\mu$m because these fillers provide a composition having a good profile of quality.

The inorganic fillers used herein may be treated on the surface. Examples of the surface treating agent include silane coupling agents, titanate coupling agents, boran coupling agents, higher fatty acids, surface active agents and other wetting agents. These surface treating agents may be adsorbed on the surface of inorganic fillers before the fillers are blended with the resin, or added to a mill along with the resin and inorganic filler upon blending.

The copolyester compositin according to the fifth aspect of the present invention comprises 100 parts by weight of a copolyester resin as defined in [1] and 1 to 400 parts by weight, preferably 10 to 250 parts by weight of an inorganic filler. The presence of 400 parts by weight of an inorganic filler renders injection molding very difficult, and invites such disadvantages as occurrence of flow marks upon molding, poor appearance of molded parts, and lack of mechanical strength.

The copolyesteramide composition according to the sixth aspect comprises 100 parts by weight of a copolyesteramide resin as defined in [1] and 1 to 400 parts by weight, preferably 10 to 250 parts by weight of an inorganic filler. The loading of the filler is chosen in this range because the appearance, mechanical strength, and mar resistance of a molded part are improved while minimizing the anisotropy thereof.

The resin compositions according to the fifth and sixth aspects of the present invention may further contain an additional unit or ingredient as long as the additional unit or ingredient does not detract from the advantages of the present invention. Compositions containing as its resinous component a copolymer or mixture of a copolyester and a copolyesteramide are also contemplated in the present invention.

The compositions of the present invention may have an additional ingredient incorporated therein. Such additional ingredients are resins; antioxidantsl anti-coloring agents; stabilizers; UV absorbers; plasticizers; lubricants such as molybdenum disulfide, silicone fluid, fluro resins and graphite; and flame retardants such as tetrabromobisphenol-A and antimony trioxide.

The compositions of the present invention can be prepared by blending the resin with an inorganic filler in any suitable commonly used milling means such as a single screw extruder, twin screw extruder, kneader, Banbury mixer, two roll mill, and Brabender mill. It is possible to add the inorganic filler to a molten resin in a reaction vessel followed by mixing. It is also possible to mold the composition while mixing the resin and the inorganic filler in a molding machine.

The copolyester and copolyesteramide compositions containing inorganic fillers not only have high heat resistance, modulus, mar resistance, and alleviated anisotropy, but are also characterized by arc resistance, welding resistance and a low factor of molding shrinkage. They are used as precision injectin molded parts for electric and mechanical equipment, oven-proof dishes, and various electronic parts.

[3] The composition according to the seventh aspect of the present invention is a magnetic resin composition comprising a copyester as defined in [1] and an effective amount of a magnetic powder.

The composition according to the eighth aspect of the present invention is a magnetic resin composition comprising a copolyesteramide as defined in [1] and an effective amount of a magnetic powder.

The magnetic powders used herein are not particularly limited, but usually selected from ferrite magnetic powders as represented by $MOFe_2O_3$ wherein M is Ba, Sr, Ca, Mg, Mn, Fe, Cu, Ni, Co, Zn or Pb; and rare earth element magnetic powders as represented by $RCo_5$ wherein R is a rare earth element such as Sm, Pr, Ce and La, $Sm_2X_{17}$ wherein X is Co, Fe, Cu, Zr, Ti or Hf, and NdFeB, and mixtures thereof.

The particle size of the magnetic powder is not critical. Preferably the magnetic powder has a particle size of from 0.1 to 100 $\mu$m, more preferably from 1 to 50 $\mu$m. Particles with a size of less than 0.1 $\mu$m tend to coalesce so that they cannot be uniformly dispersed in the composition. A resin composition loaded with particles with a size of more than 100 $\mu$m loses surface smoothness, appearance and ease of molding.

The composition contains 100 parts by weight of a resin binder and 100 to 1900 parts by weight, preferably 400 to 1150 parts by weight of a magnetic powder. A composition containing less than 100 parts by weight of a magnetic powder gives a molded part having insufficient magnetic properties to function as a magnet. A composition loaded with more than 1900 parts by weight of a magnetic powder is less flowing upon melting and is molded with extreme difficulty into a part having poor mechanical strength.

The magnetic powder used herein may be treated on the surface. Examples of the surface treating agent include silane coupling agents, titanate coupling agents, boran coupling agents, higher fatty acids, surface active agents and other wetting agents. These surface treating agents may be adsorbed on the surface of magnetic powder before the powder is blended with the resin, or added to a mill along with the resin and magnetic powder upon blending.

The magnetic powder may be blended with the resin binder in any suitable milling means such as a single screw extruder, twin screw extruder, kneader, Banbury mixer, two roll mill, and Brabender mill. It is possible to add magnetic powder to a molten resin in a reaction vessel followed by mixing. It is also possible to mold the composition while mixing the resin and magnetic powder in a molding machine.

The compositions according to the seventh and eighth aspects of the present invention may further contain an additional unit or ingredient as long as the additional unit or ingredient does not detract from the advantages of the present invention. Compositions containing as its resinous component a copolymer or mixture of a copolyester and a copolyesteramide are also contemplated in the present invention.

The compositions of the present invention may have an additional ingredient incorporated therein. Such additional ingredients are resins; antioxidants; anti-coloring agents; stabilizers; UV absorbers; plasticizers; lubricants such as molybdenum disulfide, silicone fluid, fluoro resins and graphite; and flame retardants such as tetrabromobisphenol-A and antimony trioxide.

EXAMPLES

Examples of the present invention are presented below by way of illustration and not by way of limitation.

Methods for evaluating resins of Examples and Comparative Examples are first described.

(1) Preparation of specimen

Test specimens are prepared by comminuting a polymeric resin, optionally blending the resin with a filler, milling and extruding the resin compound in a single screw extruder having a die of 20 mm in diameter (manufactured by Thermo-Plastics Kogyo K.K.) at a temperature equal to the injection molding temperature which is described later, cooling and chopping the strands into compound pellets. The pellets are injection molded through an injection molding machine, model SAV-60-52 (manufactured by Sanjo Seiki K.K.) at a mold temperature of 120° C., an injection pressure of 250 kg/cm$^2$, and a sufficient cylinder temperature to allow the mold to be fully charged with the molten resin. There are obtained test bars of $5 \times \frac{1}{2} \times \frac{1}{8}$ inches which are used to evaluate the physical properties of resins in bend, heat distortion temperature and Izod impact strength tests, test plates of $120 \times 120 \times 2$ mm which are used to evaluate the physical properties of resin compositions, and test bars of $5 \times \frac{1}{2} \times \frac{1}{4}$ inches which are used to evaluate the magnetic properties of magnetic resin compositions.

(2) Injection molding temperature (IMT)

The injection molding temperature is the cylinder temperature set in the injection molding process described in (1). The lower the injection molding temperature, the better the resin is moldable.

Bend test specimens with a width of 14 mm are prepared by cutting the test plates in a resin flow direction or machine direction (MD) and a direction transverse to the machine direction (TD).

(3) Bend test

A bend test is carried out according to ASTM D790.

(4) Anisotropy test

The flexural strengths (FS) of a specimen in MD and TD directions are determined. The ratio of MD flexural strength to TD flexural strength (MD/TD) is calculated to evaluate the anistropy of mechanicl strength. The higher the MD/TD ratio, the greater the anisotropy is.

(5) Heat distortion temperature (HDT)

The heat distortion temperture of a sample is determined according to ASTM D648 under a load of 18.6 kg/cm$^2$.

(6) Izod impact strength

Notched Izod impact strength is determined according to ASTM D256.

(7) Mar resistance (MR)

The mar resistance of a resin is judged by the method which is selected in view of a practical application of the resin. A pencil scribing test machine as prescribed in JIS K 5401 is modified by setting a 100-yen coin in a mount instead of a pencil, moving the coin under a load of 1000 g over a specimen of $120 \times 120 \times 2$ mm in five passes (each pass includes forward and backward movements) in a resin flow direction. The track of the coin is visually observed under the following criterion.

| Observation | Evaluation |
|---|---|
| No mark observable | O |

| Observation | Evaluation |
|---|---|
| Marks observable | X |

(8) Magnetic properties

A specimen having a diameter of 1" and a thickness of ½" cut from a molded part is set in a BH loop tracer (Yokogawa Electric Corp.) to determine the residual magnetic flux density Br, coercive force Hc, and maximum energy product (BH)max.

[1] First, examples of the copolyester according to the first aspect of the present invention are presented along with comparative examples.

EXAMPLE 1

A polymerization reactor equipped with a stirrer having a torque meter and revolution meter, an argon inlet tube, and a thermometer was charged with 326 grams (1.7 mol) of a polyethylene terephthalate having an inherent or logarithmic viscosity of 0.72 as measured in a 50/50 (weight ratio) phenol/tetrachloroethane mixture in a concentration of 0.5 gram/dl at 30° C., 891 grams (3.3 mol) of 4,4'-diacetoxybiphenyl, 548 grams (3.3 mol) of terephthalic acid, and 2700 grams (15 mol) of paraacetoxybenzoic acid.

The reactor was fully purged with argon before it was heated to 260° C. over about 30 minutes. Stirring was started at an intermediate of the heating process when the contents were melted. Acetic acid started stripping out at a temperature at 260° C. for about 1 hour, at 280° C. for about 1 hour, and then at 300° C. for 1 hour to conduct polymerization before the pressure was gradually reduced. Finally, reaction was conducted at 320° C. and 0.5 mmHg for 20 minutes to complete polymerization.

The resulting copolymer was injection molded to determine its physical properties. The results are shown in Table 1.

EXAMPLE 2

A polyester copolymer was synthesized and measured for physical properties by the same procedures as in Example 1 except that the reactor was charged with 461 grams (2.4 mol) of polyethylene terephthalate, 972 grams (3.6 mol) of 4,4'-diacetoxybiphenyl, 598 grams (3.6 mol) of terephthalic acid, and 2520 grams (14 mol) of paraacetoxybenzoic acid.

The results are shown in Table 1.

EXAMPLE 3

A polyester copolymer was synthesized and measured for physical properties by the same procedures as in Example 1 except that the reactor was charged with 250 grams (1.3 mol) of polyethylene terephthalate, 918 grams (3.4 mol) of 4,4'-diacetoxybiphenyl, 564 grams (3.4 mol) of terephthalic acid, and 2754 grams (15.3 mol) of paraacetoxybenzoic acid, and the final polymerization under vacuum was conducted at 340° C. and 0.5 mmHg for 20 minutes.

The results are shown in Table 1.

EXAMPLE 4

Polyeser copolymers of the formula:

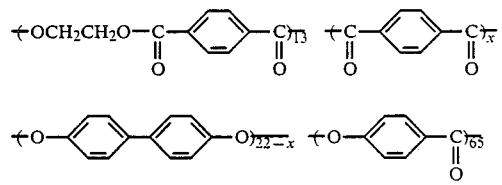

with varying molar ratios of terephthalic component to biphenol component of 0.8, 0.9, 1.0, 1.02, and 1.10 were synthesized and measured for physical properties by the same procedures as in Example 1.

The results are shown in Table 2.

The copolyesters polymerized in Examples 1–4 were observed under a polarizatin microscope (Nikon polarization microscope type POH equipped with a heat stage). They showed optical anisotropy when a light shearing stress was applied to them in molten state, indicating that they were thermotropic liquid crystalline polyesters.

COMPARATIVE EXAMPLES 1-5

For comparison purposes, conventional polyesters were synthezied according to the teachings of Japanese Patent Publication No. 56-18016 (CE 1), Japanese Patent Publication No. 59-13531 (CE 2), and Japanese Patent Application Kokai No. 58-84821 (CE 3-5) and measured for physical properties as in Example 1. The results are also shown in Table 1.

The polyesters synthesized in Examples 1–4 are satisfactory in both mechanical strength and heat resistance (heat distortiion temperature) although the polyesters of Comparative Examples 1–5 does not meet both of the requirements.

COMPARATIVE EXAMPLE 6

To compare with Example 4, polyester copolymers having varying molar ratios of terephthalic component to biphenol component of 0.5, 0.7, and 1.20 were synthesized and measured for physical properties. The results are shown in Table 2 together with the results of Example 3. It is evident that mechanical strength, particularly impact strength is substantially reduced outside the scope of the present invention.

TABLE 1

| No | Polymer Formulation | Tensile Strength (Kg/cm$^2$) | Tensile elongation (%) | Flexural strength (Kg/cm$^2$) | Flexural modulus (Kg/cm$^2$) | HDT (°C.) | IMT (°C.) |
|---|---|---|---|---|---|---|---|
| Example 1 | (a) | 1500 | 3.0 | 1450 | 82000 | 265 | 325 |
| Example 2 | (b) | 1400 | 3.5 | 1350 | 81000 | 235 | 295 |
| Example 3 | (c) | 1600 | 3.0 | 1500 | 83000 | 280 | 330 |
| Comparative Example 1 | (d) JP Pub. 56-18016 | 1000 | 4.0 | 1000 | 70000 | 70 | 270 |
| Comparative Example 2 | (e) JP Pub. 59-13531 | 800 | 2.0 | 850 | 80000 | 160 | 280 |
| Comparative Example 3 | (f) JP Kokai 58-84821 | 700 | 2.0 | 800 | 80000 | 180 | 290 |
| Comparative | (g) JP Kokai 58-84821 | 800 | 2.0 | 850 | 78000 | 200 | 300 |

TABLE 1-continued

| No | Polymer Formulation | Tensile Strength (Kg/cm²) | Tensile elongation (%) | Flexural strength (Kg/cm²) | Flexural modulus (Kg/cm²) | HDT (°C.) | IMT (°C.) |
|---|---|---|---|---|---|---|---|
| Example 4 | | | | | | | |
| Comparative Example 5 | (h) JP Kokai 58-84821 | 600 | 1.5 | 650 | 85000 | 190 | 330 |

Note:

(a) 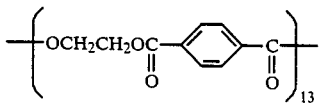

(b)

(c)

(d)

(e)

(f)

(g)

(h)

TABLE 2

| | (III)/(II) (molar ratio) | Flexural strength (kg/cm²) | Izod (Kg·cm/cm) | HDT (°C.) | IMT (°C.) |
|---|---|---|---|---|---|
| Comparative Example 6 | 1.20 | 700 | 2 | 229 | 300 |
| | 0.7 | 1160 | 10 | 188 | 288 |
| | 0.5 | 1150 | 8 | 186 | 288 |
| Example 4 | 1.10 | 1200 | 20 | 225 | 290 |
| | 1.02 | 1380 | 23 | 215 | 287 |
| | 1.0 | 1350 | 25 | 210 | 287 |
| | 0.9 | 1200 | 35 | 196 | 288 |
| | 0.8 | 1170 | 18 | 191 | 288 |

Note: Resin formulation

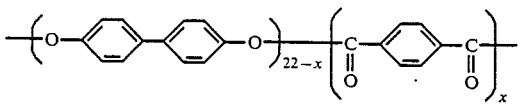

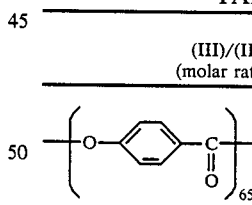

Examples of the copolyesteramide according to the third aspect of the present invention are presented along with comparative examples.

EXAMPLE 5

A polymerization reactor equipped with a stirrer having a torque meter and revolution meter, an argon inlet tube, and a thermometer was charged with 400 grams (2.08 mol, 13 mol%) of a polyethylene terephthalate having an inherent or logarithmic viscosity of 0.72 as measured in a 50/50 (weight ratio) phenol/tetrachloroethane mixture in a concentration of 0.5 gram/dl at 30° C., 475 grams (1.76 mol, 11 mol%) of 4,4'-diacetoxybiphenyl, 292 grams (1.76 mol, 11 mol%) of terephthalic acid, 1843 grams (10.24 mol, 64 mol%) of para-acetoxybenzoic acid, and 28.6 grams (0.16 mol, 1 mol%) of para-acetamidobenzoic acid.

The reactor was fully purged with argon before it was heated to 260° C. over about 30 minutes. Stirring was started at an intermediate of the heating process when the contents were melted. Acetic acid started stripping out at a temperature of approximately 230° C. The reactor was maintained at 260° C. for about 1 hour, at 280° C. for about 1 hour, and then at 300° C. for 1 hour to conduct polymerization before the pressure was gradually reduced. Finally, reaction was conducted at 320° C. and 0.5 mmHg to complete polymerization until the the stirrer reached the predetermined torque.

The resulting polyesteramide was comminuted, injection molded, and measured for physical properties. The results are shown in FIGS. 7 through 10.

Next, the procedure was repeated by replacing part of the para-acetoxybenzoic acid by para-acetamidobenzoic acid as shown below.

| Para-acetamidobenzoic acid Unit <IV> | Para-acetoxyamidobenzoic acid Unit <V> |
|---|---|
| 1858 g (10.32 mol, 64.5 mol %) | 14.3 g (0.08 mol, 0.5 mol %) |
| 1786 g (9.92 mol, 62 mol %) | 85.9 g (0.48 mol, 3 mol %) |
| 1728 g (9.6 mol, 60 mol %) | 143 g (0.8 mol, 5 mol %) |
| 1670 g (9.28 mol, 58 mol %) | 200 g (1.12 mol, 7 mol %) |
| 1584 g (8.8 mol, 55 mol %) | 286 g (1.6 mol, 10 mol %) |

Polymerization was conducted under the same conditions as above and the resulting resins were molded and measured for physical properties. The results are shown in FIGS. 7 through 10.

The copolyesteramides polymerized in the Example were observed under a polarization microscope (Nikon polarization microscope type POH equipped with a heat stage). They showed optical anisotropy when a light shearing stress was applied to them in molten state, indicating that they were thermotropic liquid crystalline polyesteramides.

COMPARATIVE EXAMPLE 7

The procedure of Example 5 was repeated except that the para-acetamidobenzoic acid was omitted and the amount of para-acetoxybenzoic acid was changed to 1872 grams (10.4 mol, 65 mol%). Separately, the procedure of Example 5 was repeated except that 1440 grams (8 mol, 50 mol%) of para-acetoxybenzoic acid and 430 grams (2.4 mol, 15 mol%) of para-acetamidobenzoic acid were used and the final polymerization temperature was set at 340° C. After injection molding, physical properties were evaluated.

The results are shown in FIGS. 7 through 10 together with the results of Example 5.

EXAMPLE 6

The procedure of Example 5 was repeated. The charges were 400 grams (2.08 mol, 13 mol%) of polyethylene terephthalate, 292 grams (1.76 mol, 11 mol%) of terephthalic acid, and 1872 grams (10.4 mol, 65 mol%) of para-acetoxybenzoic acid. The remaining charges, 4,4'-diacetoxybiphenyl and 4-acetoxyacetanilide were used in varying amounts as shown below.

| 4,4'-diacetoxybiphenyl Unit <II> | 4-acetoxyacetanilide Unit <V> |
|---|---|
| 454 g (1.68 mol, 10.5 mol %) | 15.4 g (0.08 mol, 0.5 mol %) |
| 432 g (1.6 mol, 10 mol %) | 30.9 g (0.16 mol, 1 mol %) |
| 346 g (1.28 mol, 8 mol %) | 92.6 g (0.48 mol, 3 mol %) |
| 259 g (0.96 mol, 6 mol %) | 154 g (0.8 mol, 5 mol %) |
| 173 g (0.64 mol, 4 mol %) | 216 g (1.12 mol, 7 mol %) |

Polymerization was conducted under the same conditions as in Example 5 and the resulting resins were molded and measured for physical properties. The results are shown in FIGS. 7 through 10.

The copolyesteramides polymerized in this Example were observed under a polarization microscope to find that they were thermotropic liquid crystalline polyesteramides.

EXAMPLES 7-11

Polyesteramides having varying compositions as shown in Table 3 were synthesized by the same procedure as used in Example 5. All these copolyesteramides were observed under a polarization microscope to find that they were thermotropic liquid crystalline polyesteramides. The results are shown in Table 4.

TABLE 3

| | Formulation |
|---|---|
| Example 5 | —[OCH₂CH₂OC(=O)—C₆H₄—C(=O)]₁₃—[O—C₆H₄—C₆H₄—O—C(=O)—C₆H₄—C(=O)]₁₁—[O—C₆H₄—C(=O)]₁₁—[NH—C₆H₄—C(=O)]₆₅₋ₓ—[C₆H₄—C(=O)]ₓ— ; x = 0.5, 1, 3, 5, 7, 10 |
| Comparative Example 7 | —[OCH₂CH₂OC(=O)—C₆H₄—C(=O)]₁₃—[O—C₆H₄—C₆H₄—O—C(=O)—C₆H₄—C(=O)]₁₁—[O—C₆H₄—C(=O)]₁₁—[NH—C₆H₄—C(=O)]₆₅₋ₓ—[C₆H₄—C(=O)]ₓ— ; x = 0.15 |
| Example 6 | —[OCH₂CH₂OC(=O)—C₆H₄—C(=O)]₁₃—[O—C₆H₄—C₆H₄—O—C(=O)—C₆H₄—C(=O)]₁₁—[O—C₆H₄—C(=O)]₁₁₋ₓ—[NH—C₆H₄—C(=O)]₆₅—[C₆H₄—C(=O)]ₓ— ; x = 0.5, 1, 3, 5, 7 |
| Example 7 | —[OCH₂CH₂OC(=O)—C₆H₄—C(=O)]₅—[O—C₆H₄—C₆H₄—O—C(=O)—C₆H₄—C(=O)]₁₂—[O—C₆H₄—C(=O)]₁₂—[NH—C₆H₄—C(=O)]₇₀—[C₆H₄—C(=O)]₁— |
| Example 8 | —[OCH₂CH₂OC(=O)—C₆H₄—C(=O)]₆—[O—C₁₀H₆—O—C(=O)—C₆H₄—C(=O)]₁₇—[O—C₆H₄—C(=O)]₁₇—[NH—C₆H₄—C(=O)]₅₉—[C₆H₄—C(=O)]₁— |

TABLE 3-continued
Formulation
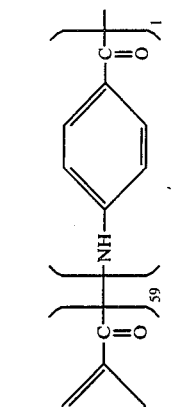

TABLE 4

| Example | Flexural strength (kg/cm$^2$) | Flexural modulus (kg/cm$^2$) | HDT (°C.) | IMT (°C.) |
| --- | --- | --- | --- | --- |
| 7 | 1550 | 115,000 | 280 | 325 |
| 8 | 1450 | 110,000 | 200 | 270 |
| 9 | 1400 | 105,000 | 180 | 260 |
| 10 | 1400 | 105,000 | 210 | 270 |
| 11 | 1350 | 100,000 | 175 | 260 |

[2] Examples of resin compositions containing inorganic fillers are presented below.

EXAMPLE 12

A polymerization reactor equipped with a stirrer having a torque meter and revolution meter, an argon inlet tube, and a thermometer was charged with 326 grams (1.7 mol) of a polyethylene terephthalate having an inherent or logarithmic viscosity of 0.72 as measured in a 50/50 (weight ratio) phenol/tetrachloroethane mixture in a concentration of 0.5 gram/dl at 30° C., 891 grams (3.3 mol) of 4,4'-diacetoxybiphenyl, 548 grams (3.3 mol) of terephthalic acid, and 2700 grams (15 mol) of paraacetoxybenzoic acid.

The reactor was fully purged with argon before it was heated to 260° C. over about 30 minutes. Stirring was started at an intermediate of the heating process when the contents were melted. Acetic acid started stripping out at a temperature of approximately 230° C. The reactor was maintained at 260° C. for about 1 hour, at 280° C. for about 1 hour, and then at 300° C. for 1 hour to conduct polymerization before the pressure was gradually reduced. Finally, reaction was conducted at 320° C. and 0.5 mmHg for 20 minutes to complete polymerization.

The resulting copolymer was milled with glass fibers having an average diameter of 11 μm and a length of 3 mm (FES-03-1208PE, manufactured by Fuji Fiber Glass K.K.) in a weight ratio of 7:3, processed into pellets, and then injection molded to determine physical properties.

The results are shown in Table 5.

EXAMPLE 13

A polyester copolymer was synthesized by the same procedure as in Example 12 except that the reactor was charged with 461 grams (2.4 mol) of polyethylene terephthalate, 972 grams (3.6 mol) of 4,4'-diacetoxybiphenyl, 598 grams (3.6 mol) of terephthalic acid, and 2520 grams (14 mol) of para-acetoxybenzoic acid and the final polymerization temperature was set at 330° C. A filled copolyester composition was prepared from the copolymer in the same manner as in Example 12.

The results are shown in Table 5.

EXAMPLE 14

A polyester copolymer was synthesized by the same procedure as in Example 12 except that the reactor was charged with 250 grams (1.3 mol) of polyethylene terephthalate, 918 grams (3.4 mol) of 4,4'-diacetoxybiphenyl, 564 grams (3.4 mol) of terephthalic acid, and 2754 grams (15.3 mol) of para-acetoxybenzoic acid, and the final polymerization temperature was set at 340° C. A filled copolyester composition was prepared from the copolymer in the same manner as in Example 12.

The results are shown in Table 5.

COMPARATIVE EXAMPLES 8-12

For comparison purposes, conventional polyesters were synthesized according to the teachings of Japanese Patent Publication No. 56-180016 (CE 8), Japanese Patent Publication No. 59-13531 (CE 9), and Japanese Patent Application Kokai No. 58-84821 (CE 10-12). Filled compositions were prepared from them and measured for physical properties as in Example 12. The results are also shown in Table 5.

EXAMPLES 15-16

The copolyester used in Example 14 was blended with glass fibers in a ratio shown in Table 5, milled, molded, and evaluated in the same manner as in Example 12.

The results are shown in Table 5.

COMPARATIVE EXAMPLE 13

The copolyester used in Example 14 was molded without an inorganic filler and evaluated.

The results are shown in Table 5.

EXAMPLE 17

The copolyester used in Example 12 was blended with wollastonite (Hayashi Chemicals K.K., UM-8N) in a weight ratio of 6:4, milled, molded, and evaluated in the same manner as in Example 12.

The results are shown in Table 6.

EXAMPLE 18

The copolyester used in Example 13 was blended with wollastonite (UM-8N) in a weight ratio of 6:4, milled, molded, and evaluated in the same manner as in Example 12.

The results are shown in Table 6.

EXAMPLE 19

The copolyester used in Example 14 was blended with wollastonite (UM-8N) in a weight ratio of 6:4, milled, molded, and evaluated in the same manner as in Example 12.

The results are shown in Table 6.

COMPARATIVE EXAMPLES 14-18

For comparison purposes, conventional polyesters were synthesized according to the teachings of Japanese Patent Publication No. 56-180016 (CE 14), Japanese Patent Publication No. 59-13531 (CE 15), and Japanese Patent Application Kokai No. 58-84821 (CE 16-18). Filled compositions were prepared from them by blending with wollastonite (UM-8N), milled, molded, and measured for physical properties as in Example 12.

The results are shown in Table 6.

EXAMPLES 20-21

The copolyester used in Example 14 was blended with wollastonite (UM-8N) in a ratio shown in Table 6, milled, molded, and evaluated in the same manner as in Example 12.

The results are shown in Table 6.

TABLE 5

| | Copolymer Resin formulation | Composition (wt %) Resin | Composition (wt %) Filler | Bend test (kg/cm²) Strength in MD | Bend test (kg/cm²) Strength in TD | Bend test (kg/cm²) MD/TD | Modulus in MD | HDT (°C.) | IMT (°C.) | Mar resistance |
|---|---|---|---|---|---|---|---|---|---|---|
| Example 12 | (a) | 70 | 30 | 2150 | 1200 | 1.8 | 150,000 | 285 | 325 | O |
| Example 13 | (b) | 70 | 30 | 2050 | 1200 | 1.7 | 140,000 | 255 | 295 | O |
| Example 14 | (c) | 70 | 30 | 2200 | 1300 | 1.7 | 155,000 | 300 | 330 | O |
| Example 15 | (c) | 90 | 10 | 1600 | 900 | 1.8 | 120,000 | 290 | 330 | O |
| Example 16 | (c) | 50 | 50 | 2600 | 1500 | 1.7 | 180,000 | 305 | 330 | O |
| Comparative Example 8 | (d) | 70 | 30 | 1400 | 740 | 1.9 | 110,000 | 80 | 270 | O |
| Comparative Example 9 | (e) | 70 | 30 | 1200 | 630 | 1.9 | 130,000 | 170 | 290 | O |
| Comparative Example 10 | (f) | 70 | 30 | 1100 | 580 | 1.9 | 130,000 | 190 | 300 | O |
| Comparative Example 11 | (g) | 70 | 30 | 1200 | 630 | 1.9 | 120,000 | 210 | 310 | O |
| Comparative Example 12 | (h) | 70 | 30 | 900 | 470 | 1.9 | 140,000 | 210 | 340 | O |
| Comparative Example 13 | (c) | 100 | 0 | 1500 | 600 | 2.5 | 83,000 | 265 | 325 | X |

TABLE 6

| Copolymer resin formulation | Composition (wt %) Resin | Composition (wt %) Filler | Bend test (kg/cm²) Strength in MD | Bend test (kg/cm²) Strength in TD | Bend test (kg/cm²) MD/TD | Modulus in MD | HDT (°C.) | IMT (°C.) | Mar resistance |
|---|---|---|---|---|---|---|---|---|---|
| Example 17 (a) | 60 | 40 | 1700 | 1000 | 1.7 | 140.000 | 275 | 325 | |
| Example 18 (b) | 60 | 40 | 1600 | 940 | 1.7 | 135.000 | 245 | 295 | |
| Example 19 (c) | 60 | 40 | 1800 | 1125 | 1.6 | 150.000 | 290 | 330 | |
| Example 20 (c) | 80 | 20 | 1500 | 830 | 1.8 | 115.000 | 285 | 330 | |
| Example 21 (c) | 30 | 70 | 1550 | 910 | 1.7 | 170.000 | 290 | 330 | |
| Comparative Example 14 (d) | 60 | 40 | 1100 | 610 | 1.8 | 85.000 | 70 | 270 | |
| Comparative Example 15 (e) | 60 | 40 | 950 | 530 | 1.8 | 120.000 | 165 | 290 | |
| Comparative Example 16 (f) | 60 | 40 | 900 | 500 | 1.8 | 120.000 | 185 | 300 | |
| Comparative Example 17 (g) | 60 | 40 | 950 | 530 | 1.8 | 110.000 | 205 | 310 | |
| Comparative Example 18 (h) | 60 | 40 | 750 | 420 | 1.8 | 130.000 | 195 | 340 | |

Note of Tables 5 and 6

(a) 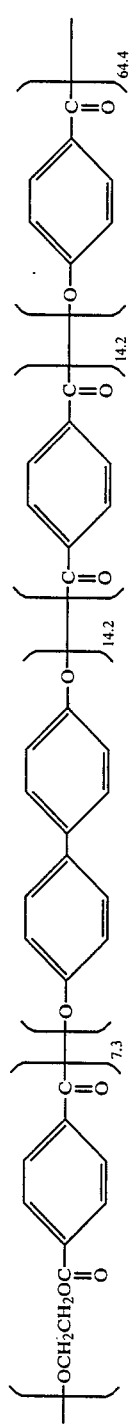

(b) 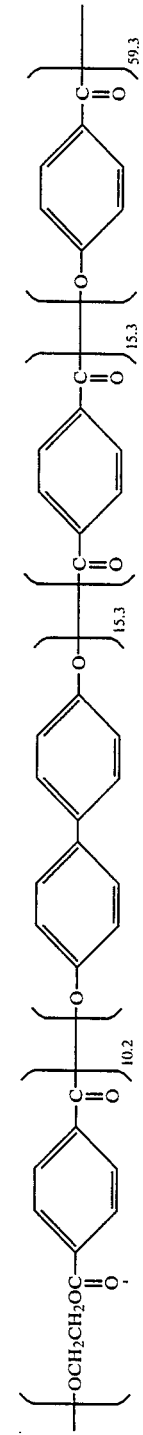

(c) 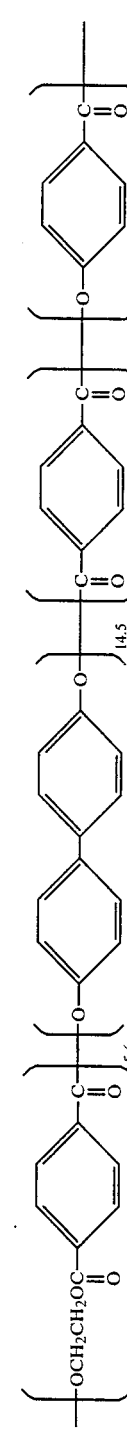

(d) Polyester known from JP Publication No. 56-18016

(e) Polyester known from JP Publication No. 59-13531

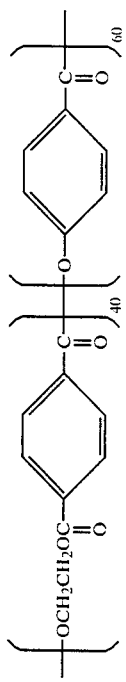

TABLE 6-continued (f) Polyester known from JP Kokai No. 58-84821

(g) Polyester known from JP Kokai No. 58-84821

(h) Polyester known from JP Kokai No. 58-84821

The copolyester according to the present invention is characterized in that it has a high heat resistant or high heat distortion temperature as well as improved mechanical strength although it can be injection molded at a relatively low temperature. Copolyester compositions filled with an organic filler not only show all these characteristics, but are also improved in anisotropy and mar resistance which are common drawbacks of unfilled copolyester compositions.

Examples of filled copolyesteramide compositions are presented below.

EXAMPLE 22

A polymerization reactor equipped with a stirrer having a torque meter and revolution meter, an argon inlet tube, and a thermometer was charged with 400 grams (2.08 mol, 13 mol%) of a polyethylene terephthalate having an inherent or logarithmic viscosity of 0.72 as measured in a 50/50 (weight ratio) phenol/tetrachloroethane mixture in a concentration of 0.5 gram/dl at 30° C., 476 grams (1.76 mol, 11 mol%) of 4,4'-diacetoxybiphenyl, 292 grams (1.76 mol, 11 mol%) of terephthalic acid, 1843 grams (10.24 mol, 64 mol%) of para-acetoxybenzoic acid, and 28.6 grams (0.16 mol, 1 mol%) of para-acetamidobenzoic acid.

The reactor was fully purged with argon before it was heated to 260° C. over about 30 minutes. Stirring was started at an intermediate of the heating process when the contents were melted. Acetic acid started stripping out at a temperature of approximately 230° C. The reactor was maintained at 260° C. for about 1 hour, at 280° C. for about 1 hour, and then at 300° C. for 1 hour to conduct polymerization before the pressure was gradually reduced. Finally, reaction was conducted at 320° C. and 0.5 mmHg to complete polymerization until the the stirrer reached the predetermined torque.

The resulting copolymer was comminuted, milled with glass fibers as in Example 12 to form a filled composition, processed into pellets, and then injection molded to determine physical properties.

The results are shown in Table 7.

EXAMPLE 23

A resin was synthesized by the same procedure as in Example 22 except that 1728 grams (9.6 mol) of paraacetoxybenzoic acid and 143 grams (0.8 mol) of paraacetamidobenzoic acid were used. The resin was milled with glass fibers, injection molded, and evaluated in the same manner as in Example 22.

The results are shown in Table 7.

EXAMPLES 24–25

The copolyesteramide used in Example 22 was milled with glass fibers in varying ratios as shown in Table 7.

The results are shown in Table 7.

COMPARATIVE EXAMPLE 20

The copolyesteramide used in Example 22 was molded without an inorganic filler and evaluated.

The results are shown in Table 7.

EXAMPLE 26

A resin was synthesized by the same procedure as in Example 22 except that 346 grams (1.28 mol) of 4,4'-diacetoxybiphenyl and 92.6 grams (0.48 mol) of 4-acetoxyacetanilide were used. The resin was blended with wollastonite (Hayashi Chemicals K.K., UM-8N) in a weight ratio of 6:4, milled, injection molded, and evaluated in the same manner as in Example 22.

The results are shown in Table 7.

EXAMPLE 27

The copolyesteramide used in Example 26 was blended with wollastonite (UM-8N) in a weight ratio of 3:7 to form a filled composition, which was milled, injection molded, and evaluated as in Example 26.

The results are shown in Table 7.

COMPARATIVE EXAMPLE 21

The copolyesteramide used in Example 26 was molded without an inorganic filler and evaluated.

The results are shown in Table 7.

TABLE 7

| | Copolymer resin formulation | Filler | Composition (wt %) Resin | Composition (wt %) Filler | Bend test (kg/cm$^2$) Strength in MD | Bend test (kg/cm$^2$) Strength in TD | MD/TD | Modulus in MD | HDT (°C.) | IMT (°C.) | Mar resistance |
|---|---|---|---|---|---|---|---|---|---|---|---|
| Example 22 | (a) | Glass fibers | 70 | 30 | 2180 | 1210 | 1.8 | 160,000 | 240 | 295 | O |
| Example 23 | (b) | Glass fibers | 70 | 30 | 2100 | 1240 | 1.7 | 150,000 | 235 | 300 | O |
| Example 24 | (a) | Glass fibers | 90 | 10 | 1650 | 870 | 1.9 | 125,000 | 230 | 295 | O |
| Example 25 | (a) | Glass fibers | 50 | 50 | 2600 | 1370 | 1.9 | 185,000 | 245 | 295 | O |
| Example 26 | (c) | Wollastonite | 60 | 40 | 1750 | 920 | 1.9 | 140,000 | 240 | 305 | O |
| Example 27 | (c) | Wollastonite | 30 | 70 | 1550 | 820 | 1.9 | 170,000 | 255 | 305 | O |
| Comparative Example 20 | (a) | — | 100 | 0 | 1500 | 630 | 2.4 | 110,000 | 206 | 295 | X |
| Comparative Example 21 | (c) | — | 100 | 0 | 1510 | 660 | 2.3 | 107,000 | 215 | 305 | X |

TABLE 7-continued

| Copolymer resin formulation | Filler | Composition (wt %) Resin | Composition (wt %) Filler | Bend test (kg/cm²) Strength in MD | Bend test (kg/cm²) Strength in TD | MD/TD | Modulus in MD | HDT (°C.) | IMT (°C.) | Mar resistance |
|---|---|---|---|---|---|---|---|---|---|---|
| Example 21 | | | | | | | | | | |

Note:

(a)

$$\left\{ OCH_2CH_2OC\!-\!\!\bigcirc\!\!-\!\!\underset{\underset{O}{\|}}{C} \right\}_{13} \left\{ O\!-\!\!\bigcirc\!\!-\!\!\bigcirc\!\!-\!O \right\}_{11} \left\{ \underset{\underset{O}{\|}}{C}\!-\!\!\bigcirc\!\!-\!\!\underset{\underset{O}{\|}}{C} \right\}_{11} \left\{ O\!-\!\!\bigcirc\!\!-\!\!\underset{\underset{O}{\|}}{C} \right\}_{64} \left\{ NH\!-\!\!\bigcirc\!\!-\!\!\underset{\underset{O}{\|}}{C} \right\}_{1}$$

(b)

$$\left\{ OCH_2CH_2OC\!-\!\!\bigcirc\!\!-\!\!\underset{\underset{O}{\|}}{C} \right\}_{13} \left\{ O\!-\!\!\bigcirc\!\!-\!\!\bigcirc\!\!-\!O \right\}_{11} \left\{ \underset{\underset{O}{\|}}{C}\!-\!\!\bigcirc\!\!-\!\!\underset{\underset{O}{\|}}{C} \right\}_{11} \left\{ O\!-\!\!\bigcirc\!\!-\!\!\underset{\underset{O}{\|}}{C} \right\}_{60} \left\{ NH\!-\!\!\bigcirc\!\!-\!\!\underset{\underset{O}{\|}}{C} \right\}_{5}$$

(c)

$$\left\{ OCH_2CH_2OC\!-\!\!\bigcirc\!\!-\!\!\underset{\underset{O}{\|}}{C} \right\}_{13} \left\{ O\!-\!\!\bigcirc\!\!-\!\!\bigcirc\!\!-\!O \right\}_{8} \left\{ \underset{\underset{O}{\|}}{C}\!-\!\!\bigcirc\!\!-\!\!\underset{\underset{O}{\|}}{C} \right\}_{11} \left\{ O\!-\!\!\bigcirc\!\!-\!\!\underset{\underset{O}{\|}}{C} \right\}_{65} \left\{ NH\!-\!\!\bigcirc\!\!-\!O \right\}_{3}$$

[3] Examples of the magnetic resin composition are presented below.

EXAMPLE 28

A 5-liter glass reaction vessel equipped with an agitator with a torque meter and a revolution meter, an argon inlet tube, and a thermometer was charged with 400 grams (2.084 mol) of a polyethylene terephthalate having an inherent or logarithmic viscosity of 0.72 as measured in a 50/50 (weight ratio) phenol/tetrachloroethane mixture in a concentration of 0.5 gram/dl at 30° C., 476 grams (1.76 mol) of 4,4'-diacetoxybiphenyl, 292 grams (1.76 1 mol) of terephthalic acid, and 1872 grams (10.4 mol) of paraacetoxybenzoic acid. The interior of the vessel was fully replaced by argon and then heated up to a temperature of 250° C. over a period of about 30 minutes. After the contents were melted, agitation was started.

After acetic acid started distilling out, the temperature was raised to 280° C. over 10 minutes, maintained at the temperature for 30 minutes, again raised to 300° C. over 10 minutes, and maintained at the temperature for 30 minutes.

The temperature was raised to 310° C. over 10 minutes, and then the pressure was gradually reduced eventually to 1 mmHg over a period of about 20 minutes. Polymerization was continued under these conditions until the agitator reached a predetermined torque at a predetermined rpm.

The resulting copolymer was solidified, comminuted, and blended with Ba-ferrite (TR-M, manufactured by Tone Sangyo K.K.) in a weight ratio of resin to ferrite of 1:9 in an extruder with a die having a diameter of 20 mm (manufactured by Thermo-Plastics Kogyo K.K.), pelletized, and then injection molded into specimens which were measured for physical properties.

The results are shown in Table 8.

COMPARATIVE EXAMPLE 22

For comparison purpose, nylon-6, A 1022LP (manufactured by Sekisui Plastics Co., Ltd.) was blended and milled with barium ferrite in a weight ratio of 1:9, pelletized, injection molded, and evaluated for physical properties in the same manner as in Example 28.

The results are shown in Table 8.

EXAMPLE 29

A polyester copolymer was synthesized by the same procedure as in Example 22 except that the reactor was charged with 461 grams (2.4 mol) of polyethylene terephthalate, 972 grams (3.6 mol) of 4,4'-diacetoxybiphenyl, 598 grams (3.6 mol) of terephthalic acid, and 2520 grams (14 mol) of para-acetoxybenzoic acid and the final polymerization temperature was set at 330° C. A magnetic copolyester composition was prepared from the copolymer by blending barium ferrite in the same manner as in Example 28.

The results are shown in Table 8.

EXAMPLE 30

A polyester copolymer was synthesized by the same procedure as in Example 28 except that the reactor was charged with 250 grams (1.3 mol) of polyethylene terephthalate, 918 grams (3.4 mol) of 4,4'-diacetoxybiphenyl, 564 grams (3.4 mol) of terephthalic acid, and 2754 grams (15.3 mol) of para-acetoxybenzoic acid, and the final polymerization temperature was set at 340° C. A magnetic copolyester composition was prepared from the copolymer by blending with barium ferrite in the same manner as in Example 28.

The results are shown in Table 8.

COMPARATIVE EXAMPLES 23–24

For comparison purposes, polyesters having the compositions shown in Table 8 were synthesized. Magnetic compositions were prepared from them by blending with barium ferrite (TR-M), milled, molded, and measured for physical properties as in Example 28.

The results are also shown in Table 8.

EXAMPLES 31–33

The copolyesters used in Examples 28–30 were blended with barium ferrite (TR-M) in a ratio of 3:17, milled, molded, and evaluated in the same manner as in Example 28.

The results are shown in Table 8.

COMPARATIVE EXAMPLES 25–27

Magnetic compositions were prepared by blending the copolymers used in Comparative Examples 22–24 with barium ferrite in a ratio of 3:17, milled, molded, and evaluated in a similar manner.

The results are shown in Table 8.

TABLE 8

| | Resin formulation (mol %) I II III IV V | Resin/ferrite (wt ratio) | Br(G) | Hc(Oe) | (BH)max (MGOe) | Flexural strength (Kg/cm²) | IMT(°C.) | HDT(°C.) |
|---|---|---|---|---|---|---|---|---|
| Example 28 | (a) | 1:9 | 2050 | 2000 | 1.2 | 1050 | 280 | 230 |
| Example 29 | (b) | 1:9 | 2050 | 2000 | 1.2 | 1030 | 300 | 265 |
| Example 30 | (c) | 1:9 | 2050 | 2000 | 1.2 | 1060 | 335 | 310 |
| Example 31 | (a) | 3:17 | 1940 | 1890 | 1.1 | 1080 | 280 | 230 |
| Example 32 | (b) | 3:17 | 1940 | 1890 | 1.1 | 1070 | 300 | 265 |
| Example 33 | (c) | 3:17 | 1940 | 1890 | 1.1 | 1090 | 335 | 310 |
| Comparative Example 22 | nylon-6 | 1:9 | 2050 | 2000 | 1.2 | 900 | 290 | 150 |
| Comparative Example 23 | (d) | 1:9 | 2050 | 2000 | 1.2 | 920 | 290 | 80 |
| Comparative Example 24 | (e) | 1:9 | 2050 | 2000 | 1.2 | 900 | 290 | 200 |
| Comparative Example 25 | nylon-6 | 3:17 | 1940 | 1890 | 1.1 | 500 | 290 | 150 |
| Comparative Example 26 | (d) | 3:17 | 1940 | 1890 | 1.1 | 930 | 290 | 80 |
| Comparative Example 27 | (e) | 3:17 | 1940 | 1890 | 1.1 | 500 | 290 | 200 |

Note:
(a)

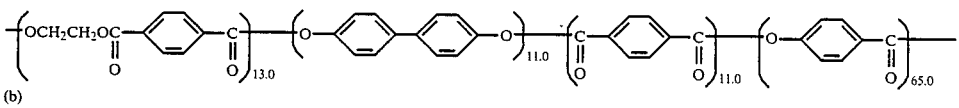

(b)

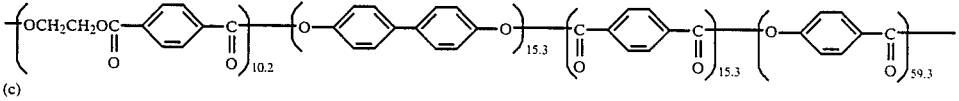

(c)

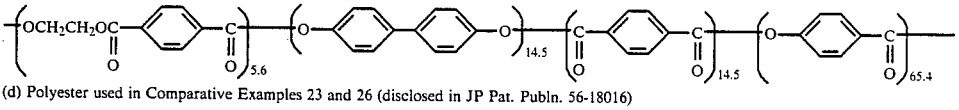

(d) Polyester used in Comparative Examples 23 and 26 (disclosed in JP Pat. Publn. 56-18016)

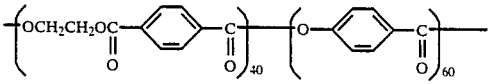

(e) Polyester used in Comparative Examples 24 and 27 (disclosed in JP Pat. Kokai 58-84821)

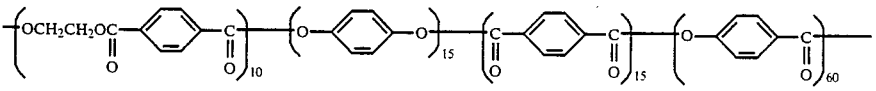

EXAMPLE 34

A polymerization reactor equipped with a stirrer having a torque meter and revolution meter, an argon inlet tube, and thermometer was charged with 400 grams (2.08 mol, 13 mol%) of a polyethylene terephthalate having an inherent or logarithmic viscosity of 0.72 as measured in a 50/50 (weight ratio) phenol/tetrachloroethane mixture in a concentration of 0.5 gram/dl at 30° C., 475 grams (1.76 mol, 11 mol%) of 4,4'-diacetoxybiphenyl, 292 grams (1.76 mol, 11 mol%) of terephthalic acid, 1843 grams (10.24 mol, 64 mol%) of para-acetoxybenzoic acid, and 28.6 grams (0.16 mol, 1 mol%) of para-acetamidobenzoic acid.

The reactor was fully purged with argon before it was heated to 260° C. over about 30 minutes. Stirring was started at an intermediate of the heating process when the contents were melted. Acetic acid started stripping out at a temperature of approximately 230° C. The reactor was maintained at 260° C. for about 1 hour, at 280° C. for about 1 hour, and then at 300° C. for 1 hour to conduct polymerization before the pressure was gradually reduced. Finally, reaction was conducted at 320° C. and 0.5 mmHg to complete polymerization until the the stirrer reached the predetermined torque.

The resulting polyesteramide copolymer was comminuted, blended with barium ferrite (TR-M, manufactured by Tone Sangyo K.K.) in a weight ratio of resin/ferrite of 1/9 to form a magnetic composition, milled, pelletized, and then injection molded to determine physical properties in the same manner as in Example 28.

The results are shown in Table 9.

EXAMPLE 35

A resin was synthesized by the same procedure as in Example 34 except that 1728 grams (9.6 mol, 60 mol%) of para-acetoxybenzoic acid and 143 grams (0.8 mol, 5 mol%) of para-acetamidobenzoic acid were used. The resin was blended with barium ferrite (TR-M), milled, pelletized, injection molded, and evaluated in a similar manner.

The results are shown in Table 9.

EXAMPLE 36

A resin was synthesized by the same procedure as in Example 34 except that 346 grams (1.28 mol, 8 mol%) of 4,4'-diacetoxybiphenyl and 92.6 grams (0.48 mol, 3 mol%) of 4-acetoxyacetanilide were used. The resulting polyesteramide copolymer was comminuted, blended with barium ferrite (TR-M) in a weight ratio of resin/ferrite of 1/9 to form a magnetic composition, which was milled, pelletized, and then injection molded to determine physical properties in a similar manner.

The results are shown in Table 9.

EXAMPLE 37

The copolyesteramide used in Example 34 was blended with barium ferrite (TR-M) in a weight ratio of resin/ferrite of 15/85 to form a magnetic composition, which was milled, injection molded, and evaluated in a similar manner.

The results are shown in Table 9.

EXAMPLE 38

The copolyesteramide used in Example 35 was blended with barium ferrite (TR-M) in a weight ratio of resin/ferrite of 15/85 to form a magnetic composition, which was milled, injection molded, and evaluated in a similar manner.

The results are shown in Table 9.

EXAMPLE 39

The copolyesteramide used in Example 36 was blended with barium ferrite (TR-M) in a weight ratio of resin/ferrite of 15/85 to form a magnetic composition, which was milled, injection molded, and evaluated in a similar manner.

The results are shown in Table 9.

peratures of 260°–350° C. The molded articles have a heat distortion temperature as high as 170°–320° C.

The copolyesteramide of the present invention can be easily injection molded while exhibiting improved appearance, heat resistance, mechanical strength, flame retardance, a low coefficient of linear expansion, and a low factor of molding shrinkage.

The method for preparing injection molded articles from the copolyesteramide is characterized by ease of molding because of injection molding at relatively low temperatures of 260°–350° C. The molded articles have a heat distortion temperature as high as 100°–280° C.

[2] The filled copolyester and copolyesteramide compositions of the present invention have improved heat resistance, mechanical properties, dimensional stability, moldability, flame retardance, chemical resistance, solvent resistance, aesthetic appearance, mar resistance, and minimized anisotropy in mechanical strength, exhibiting a good profile of physical properties.

[3] The magnetic resin compositions of the present invention have improved mechanical strength, heat resistance, and ease of molding as compared with conventional ones. Plastic magnets which will find a wider variety of applications are molded therefrom.

We claim:

1. A copolyesteramide consisting essentially of units <I>, <II>, <III>, <IV>, and <V> of the following formulae:

TABLE 9

| | Resin | Composition (wt %) Resin | Composition (wt %) Ferrite | Br (G) | Hc (Oe) | (BH)max (MGOe) | Flexural strength (Kg/cm$^2$) | IMT (°C.) | HDT (°C.) |
|---|---|---|---|---|---|---|---|---|---|
| Example 34 | (f) | 10 | 90 | 2050 | 2000 | 1.2 | 1120 | 295 | 225 |
| Example 35 | (g) | 10 | 90 | 2050 | 2000 | 1.2 | 1130 | 300 | 220 |
| Example 36 | (h) | 10 | 90 | 2050 | 2000 | 1.2 | 1100 | 305 | 230 |
| Example 37 | (f) | 15 | 85 | 1940 | 1890 | 1.1 | 1170 | 295 | 225 |
| Example 38 | (g) | 15 | 85 | 1940 | 1890 | 1.1 | 1180 | 300 | 220 |
| Example 39 | (h) | 15 | 85 | 1940 | 1890 | 1.1 | 1140 | 305 | 230 |

Note:
(f)
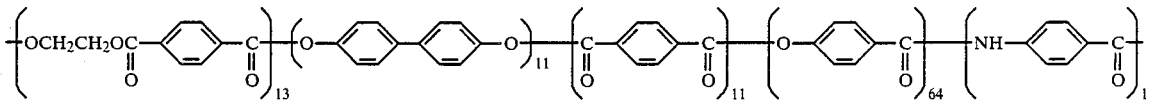

(g)
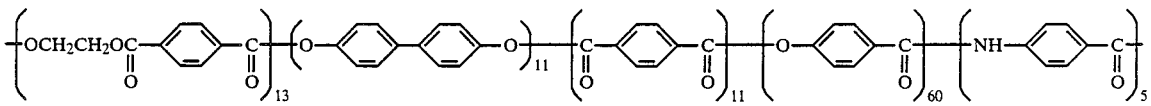

(h)
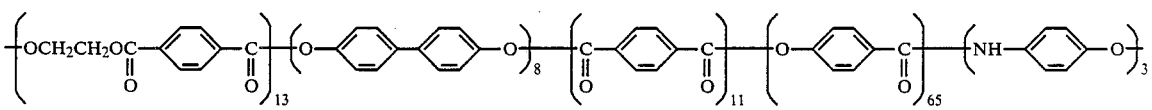

The present invention has the following benefits.

[1] The copolyester of the present invention can be easily prepared from readily available raw materials and easily injection molded while exhibiting improved heat resistance, machanical strength, flame retardancy, chemical resistance, solvent resistance, appearance, a low coefficient of linear expansion, and a low factor of molding shrinkage.

The method for preparing injection molded articles from the copolyester is characterized by ease of molding because of injection molding at relatively low tem-

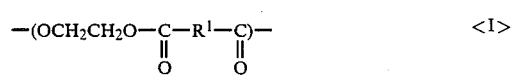

-continued $$-(O-R^4-\underset{\underset{O}{\|}}{C})- \quad <IV>$$

$$-(X^1-R^5-X^2)- \quad <V>$$

wherein
each of $R^1$, $R^2$, $R^3$ and $R^4$ is independently at least one divalent radical selected from the group consisting of para-phenylene, 2,6-naphthalene, and 4,4'-biphenylene,
$R^5$ is a para- or meta-phenylene radical,
$X^1$ is —NH—,
$X^2$ is —NH—, —O—, or $$-\underset{\underset{O}{\|}}{C}-.$$

$R^1$ through $R^4$ may be the same or different, and some of the hydrogen atoms on the aromatic rings in $R^1$ through $R^5$ may be replaced by a lower alkyl, halogen, nitro, cyano, or alkoxy radical,
in the following molar amounts:

| unit $<I>$ | 3 to 30 mol %, |
|---|---|
| unit $<II>$ | 5 to 30 mol %, |
| unit $<IV>$ | 30 to 85 mol %, and |
| unit $<V>$ | 0.1 to 10 mol %, | based on the total molar amount of units $<I>$, $<II>$, $<III>$, $<IV>$, and $<V>$, with the molar ratio of unit $<III>/(<II>+<V>)$ ranging from 8/10 to 11/10 when $X^2$ is —NH— or —O—, and the molar ratio of unit $<III>/<II>$ ranging from 8/10 to 11/10 when $X^2$ is $$-\underset{\underset{O}{\|}}{C}-.$$

2. A method for preparing a molded copolyesteramide article, comprising injection molding a copolyesteramide at a melting temperature of from 260° to 350° C., said copolyesteramide consisting essentially of units $<I>$, $<II>$, $<III>$, $<IV>$, and $<V>$ of the following formulae:

$$-(OCH_2CH_2O-\underset{\underset{O}{\|}}{C}-R^1-\underset{\underset{O}{\|}}{C})- \quad <I>$$

$$-(O-R^2-O)- \quad <II>$$

$$-(\underset{\underset{O}{\|}}{C}-R^3-\underset{\underset{O}{\|}}{C})- \quad <III>$$

$$-(O-R^4-\underset{\underset{O}{\|}}{C})- \quad <IV>$$

$$-(X^1-R^5-X^2)- \quad <V>$$

wherein
each of $R^1$, $R^2$, $R^3$ and $R^4$ is independently at least one divalent radical selected from the group consisting of para-phenylene, 2,6-naphthalene, and 4,4'-biphenylene,
$R^5$ is a para- or meta-phenylene radical,
$X^1$ is —NH—,
$X^2$ is —NH—, —O—, or $$-\underset{\underset{O}{\|}}{C}-,$$

$R^1$ through $R^4$ may be the same or different, and some of the hydrogen atoms on the aromatic rings in $R^1$ through $R^5$ may be replaced by a lower alkyl, halogen, nitro, cyano, or alkoxy radical,
in the following molar amounts:

| unit $<I>$ | 3 to 30 mol %, |
|---|---|
| unit $<II>$ | 5 to 30 mol %, |
| unit $<IV>$ | 30 to 85 mol %, and |
| unit $<V>$ | 0.1 to 10 mol %, | based on the total molar amount of units $<I>$, $<II>$, $<III>$, $<IV>$, and $<V>$, with the molar ratio of unit $<III>/(<II>+<V>)$ ranging from 8/10 to 11/10 when $X^2$ is —NH— or —O—, and the molar ratio of unit $<III>/<II>$ ranging from 8/10 to 11/10 when $X^2$ is $$-\underset{\underset{O}{\|}}{C}-,$$

thereby obtaining a molded resin having a heat distortion temperature of from 100° to 280° C.

3. A copolyesteramide composition comprising 100 parts by weight of a copolyesteramide consisting essentially of units $<I>$, $<II>$, $<III>$, $<IV>$, and $<V>$ of the following formulae:

$$-(OCH_2CH_2O-\underset{\underset{O}{\|}}{C}-R^1-\underset{\underset{O}{\|}}{C})- \quad <I>$$

$$-(O-R^2-O)- \quad <II>$$

$$-(\underset{\underset{O}{\|}}{C}-R^3-\underset{\underset{O}{\|}}{C})- \quad <III>$$

$$-(O-R^4-\underset{\underset{O}{\|}}{C})- \quad <IV>$$

$$-(X^1-R^5-X^2)- \quad <V>$$

wherein
each of $R^1$, $R^2$, $R^3$ and $R^4$ is independently at least one divalent radical selected from the group consisting of para-phenylene, 2,6-naphthalene, and 4,4'-biphenylene,
$R^5$ is a para- or meta-phenylene radical,
$X^1$ is —NH—,
$X^2$ is —NH—, —O—, or $$-\underset{\underset{O}{\|}}{C}-,$$

$R^1$ through $R^4$ may be the same or different, and some of the hydrogen atoms on the aromatic rings in $R^1$ through $R^5$ may be replaced by a lower alkyl, halogen, nitro, cyano, or alkoxy radical, in the following molar amounts:

| unit <I>  | 3 to 30 mol %,    |
| unit <II> | 5 to 30 mol %,    |
| unit <IV> | 30 to 85 mol %, and |
| unit <V>  | 0.1 to 10 mol %,  | based on the total molar amount of units <I>, <II>, <III>, <IV>, and <V>, with the molar ratio of unit <III>/(<II>+<V>) ranging from 8/10 to 11/10 when $X^2$ is —NH— or —O—, and the molar ratio of unit <III>/<II> ranging from 8/10 to 11/10 when $X^2$ is

and 1 to 400 parts by weight of an inorganic filler.

4. The copolyesteramide composition of claim 3 wherein the inorganic filler comprises glass fibers.

5. The copolyesteramide composition of claim 3 wherein the inorganic filler comprises wollastonite.

6. A magnetic resin composition comprising 100 parts by weight of a copolyesteramide consisting essentially of units <I>, <II>, <III>, <IV>, and <V> of the following formulae:

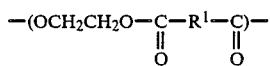      <I>

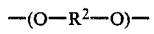      <II>

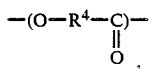      <III>

—(O—R⁴—C)—      <IV>
      ‖
      O

—(X¹—R⁵—X²)—      <V> wherein each of $R^1$, $R^2$, $R^3$ and $R^4$ is independently at least one divalent radical selected from the group consisting of para-phenylene, 2,6-naphthalene, and 4,4′-biphenylene, $R^5$ is a para- or meta-phenylene radical, $X^1$ is —NH—, $X^2$ is —NH—, —O—, or

$R^1$ through $R^4$ may be the same or different, and some of the hydrogen atoms on the aromatic rings in $R^1$ through $R^5$ may be replaced by a lower alkyl, halogen, nitro, cyano, or alkoxy radical, in the following molar amounts:

| unit <I>  | 3 to 30 mol %,    |
| unit <II> | 5 to 30 mol %,    |
| unit <IV> | 30 to 85 mol %, and |
| unit <V>  | 0.1 to 10 mol %,  | based on the total molar amount of units <I>, <II>, <III>, <IV>, and <V>, with the molar ratio of unit <III>/(<II>+<V>) ranging from 8/10 to 11/10 when $X^2$ is —NH— or —O—, and the molar ratio of unit <III>/<II> ranging from 8/10 to 11/10 when $X^2$ is

and 100 to 1900 parts by weight of a magnetic powder.

7. The magnetic composition of claim 6 wherein the magnetic powder comprises barium ferrite.

* * * * *